United States Patent [19]
Kaneko et al.

[11] Patent Number: 5,915,409
[45] Date of Patent: Jun. 29, 1999

[54] MANIFOLD

[75] Inventors: Yoshihide Kaneko; Shūzo Masuo; Masahiro Tada, all of Komaki, Japan

[73] Assignee: CKD Corporation, Japan

[21] Appl. No.: 08/869,952

[22] Filed: Jun. 5, 1997

[30] Foreign Application Priority Data

Jun. 13, 1996 [JP] Japan ................................. 8-152302
Jun. 19, 1996 [JP] Japan ................................. 8-158104

[51] Int. Cl.⁶ .................................................. F15B 13/08
[52] U.S. Cl. ..................... 137/270; 137/596.16; 137/884
[58] Field of Search ............................. 137/270, 596.16, 137/884

[56] References Cited

U.S. PATENT DOCUMENTS

| | | | |
|---|---|---|---|
| 2,881,801 | 4/1959 | McCormick | 137/270 X |
| 3,171,435 | 3/1965 | Lansky et al. | 137/596.16 |
| 3,603,348 | 9/1971 | Wright | 137/591.16 X |
| 4,130,137 | 12/1978 | Lane | 137/884 |
| 4,718,451 | 1/1988 | Kosugi | 137/884 X |
| 4,815,496 | 3/1989 | Nishitani et al. | 137/884 |
| 4,898,203 | 2/1990 | Kobelt . | |
| 5,333,647 | 8/1994 | Fukano et al. | 137/596.16 X |
| 5,341,846 | 8/1994 | Framberg | 137/884 |

FOREIGN PATENT DOCUMENTS 73 17 544  10/1988  Germany .

OTHER PUBLICATIONS

"Mix–And–Match Valves Boost Pneumatic Versatility", Machine Design, vol. 62, No. 20, Oct. 11, 1990.

*Primary Examiner*—Gerald A. Michalsky
*Attorney, Agent, or Firm*—Finnegan, Henderson, Farabow, Garrett & Dunner, LLP

[57] ABSTRACT

A manifold comprising a supply port, an exhaust port and an output port in which two on-off valves or more different in the number of the output ports or output types are mounted on a manifold base, wherein the two on-off valves or more are mounted on the manifold base in the same direction, and the distance from the manifold base to the outside of the two on-off valves or more is constant.

21 Claims, 37 Drawing Sheets

MANIFOLD

BACKGROUND OF THE INVENTION

1. Field of the Invention

The present invention relates to an air pressure switching valve, and more specifically, to a manifold provided with two switching valves or more different in the number of ports or output type.

2. Description of the Related Art

Pneumatic apparatuses have been heretofore used in various fields of industry because of their low cost, labor saving and automation. Further, since air pressure can be always kept clean relative to environments, they are recently being used in the production line of semiconductors.

Particularly, in pneumatic apparatuses for automatic control, an air pressure switching valve which constitutes an important constituent portion uses an air pressure switching valve different in number of a plurality of ports. However, they are formed into a manifold due to the space saving, pipe saving, easiness of management, and the like.

FIGS. 34 and 35 show a first conventional embodiment of a manifold provided with a 3-port valve and a 5-port valve, which is an air pressure switching valve. FIG. 34 is a top view of the manifold, and FIG. 35 is a sectional view of a 5-port valve portion of the manifold. In FIG. 34, a manifold 200 is composed of a manifold base 201, 3-port valves 203a, 203b, and a 5-port valve 204.

The 3-port valve has two kinds, one being an NO type in which normally, an air port is communicated with an output port, the other being an NC type in which normally, an exhaust port is communicated with an output port. Since the exhaust port of the 3-port valve can be closed into a 2-port valve, the 2-port valve can be mounted.

In the manifold base 201, an air port 209a is formed in a connection surface with a 5-port valve or the like, as shown in FIG. 35. The manifold base 201 is formed with an air flowpassage 212 perpendicular to an air port such as a 5-port valve, the air port such as a 5-port valve being communicated with an air flowpassage 212. This provides a concentrated supply of air. The exhaust is discharged out of an exhaust port provided in each air pressure switching valve.

On the other hand, on the side of a connection surface with the manifold base 201 of the 5-port valve 204 are formed an air port 209b and two exhaust ports 207 and 208. A method for mounting the 5-port valve 204 on the manifold base 201 will be described hereinafter. The air port 209b formed in the 5-port valve 204 is connected to the air port 209a formed in the connection surface of the manifold base 201, and the 5-port valve 204 is mounted on the manifold base 201. A seal gasket 211 is mounted on a connection portion of the air port so as to prevent air from leaking out of the connection surface. The 3-port valves 203a and 203b can be also mounted on the manifold base 201 in a similar method.

Various pneumatically-operated apparatuses not shown are mounted on the output ports 205, 206 of the manifold 200 constructed as described above. Air having a predetermined pressure is supplied to the air flowpassage 212 from an air pressure supply apparatus not shown to operate the air pressure switching valve thereby operating various pneumatically-operated apparatuses.

However, the aforementioned manifold 200 had the following problem. Since the 3-port valve is different in size from the 5-port valve, the distance from the manifold base is disorderly. As a result, in case of an output port and a solenoid valve, a difference in level occurs in electric wiring portions, and pipes and wirings become complicated.

For solving the aforementioned problem, FIGS. 36 and 37 show a second conventional embodiment of a manifold in which a 3-port valve and a 5-port valve are provided on a manifold base mainly for a 5-port valve proposed. FIG. 36 is a top view of a manifold, and FIG. 37 is a sectional view of a 5-port valve portion of the manifold. As shown in FIG. 36, a manifold 220 is composed of a manifold base 221, 3-port valves 223a, 223b, and a 5-port valve 224. An exhaust port and an output port of the 5-port valve are closed one by one and used as a 3-port valve. Therefore, the 3-port valve is the same in dimension as that of the 5-port valve.

On the connection surface with the 5-port valve or the like of the manifold base 221 are formed an air port 229a, two exhaust ports 227a and 228a, and two output ports 225a and 226a, as shown in FIG. 37. The manifold base 221 is formed with an air flowpassage 232 and exhaust flowpassages 230 and 231 perpendicularly to the air port 229a and the exhaust ports 227a and 228a, and an air port and an exhaust port of the 5-port valve or the like are communicated with the air flowpassage 232 and the exhaust flowpassages 230 and 231. This can provide a concentrated supply of air and a concentrated discharge of air. In the case where clean environments are necessary in the industry of semiconductors, the manifold is large in dimension but a pilot exhaust as well as a concentrated exhaust are carried out.

On the other hand, on the connection surface with the manifold base 221 of the 5-port valve 224 are formed an air port 229b, two exhaust ports 227b and 228b, and two output ports 225b and 226b.

A method for mounting the 5-port valve on the manifold base will be described hereinafter. The air port 229b, the exhaust ports 227b, 228b and the output ports 225b, 226b formed in the connection surface of the 5-port valve 224 are connected to the air port 229a, the exhaust ports 227a, 228a and the output ports 225a, 226a formed in the connection surface of the manifold base 221, and the 5-port valve 224 is mounted on the manifold base 221. A seal gasket 233 is mounted on the connection portion of each port so as to prevent air from leaking out of the connection surface.

With respect to the 3-port valve, since the number of ports formed in the connection surface of the air pressure switching valve is different from that of ports formed in the connection surface of the manifold base, the 3-port valve is mounted on the manifold base after completion of the following work.

The NO type 3-port valve 223a and the NC type 3-port valve 223b are mounted on the manifold base 221 with the output port 226a and the output port 225a, respectively, closed.

Since the thus constructed manifold 220 is mainly constituted by the 5-port valve, the 5-port valve is mounted in the same direction with respect to the manifold base 221, and the distance from the manifold base 221 to the outside of the 5-port valve and the 3-port valve is constant. Further, since the output ports are also formed in the manifold base 221, pipes and wirings are completely arranged, this overcoming the problem noted in the aforementioned first conventional embodiment.

FIGS. 38, 39 and 40 show a third conventional embodiment of a manifold on which NO type and NC type 3-port valves can be mounted. Here, the NO type is of a flowpassage shape in which normally, an air port is communicated with an output port, and the NC type is of a flowpassage shape in which normally, an output port is communicated with an exhaust port. For example, in case of a solenoid valve, in the deenergized mode, the NO type is that an air port is communicated with an output port, and the NC type is that an output port is communicated with an exhaust port. FIG. 38 is a plan view of a manifold, FIG. 39 is a sectional view of an NO type 3-port valve portion of a manifold, and FIG. 40 is a sectional view of an NC type 3-port valve portion of a manifold. In FIG. 38, a manifold 300 is composed of a manifold base 301, an NO type 3-port valve 302 and an NC type 3-port valve 303.

In the manifold base 301, an air port 309a, an exhaust port 308a and an output port 307a are formed in the connection surface with the 3-port valve. Further, in the manifold base 301, an air flowpassage 304 and an exhaust flowpassage 305 are formed perpendicularly to an air port 309b and an exhaust port 308b of the 3-port valve, the air port 309b and the exhaust port 308b of the 3-port valve being communicated with the air flowpassage 304 and the exhaust flowpassage 305, respectively. This concentratedly processes supply and exhaust of air. Pilot exhaust is discharged from a pilot exhaust port 306 provided in the 3-port valve.

In the case where clean environments are necessary in the industry of semiconductors, the manifold is large in dimension, but the pilot exhaust is accomplished by concentrated exhaust.

On the other hand, on the connection surface side with the manifold base 301 of the 3-port valves 302 and 303 are formed an air port 309b, an exhaust port 308b and an output port 307b. The NO type 3-port valve 302 and the NC type 3-port valve 303 house therein different shapes of spools 310 and 311. An NO type flowpassage or an NC type flowpassage is determined depending on the shape of the spools.

A method for mounting the 3-port valves 302 and 303 on the manifold base 301 will be described hereinafter.

The air port 309b, the exhaust ports 308b and the output ports 307b formed in the connection surface of the 3-port valves 302 and 303 are connected to the air port 309a, the exhaust port 308a and the output port 307a formed in the connection surface of the manifold base 301, and the 3-port valves 302 and 303 are mounted on the manifold base 301. A seal gasket 312 is mounted on the connection portion of each port so as to prevent air from leaking out of the connection surface.

Various pneumatically-operated apparatuses not shown are mounted on the output port 307a of the manifold 300 constructed as described above. Air having a predetermined pressure is supplied to the air flowpassage 304 from an air pressure supply apparatus not shown to operate the air pressure switching valve thereby operating various pneumatically-operated apparatuses.

However, the aforementioned manifold 300 had the following problem. The NO type 3-port valve and the NC type 3-port valve are manufactured by changing the shape of the spools within the 3-port valve. In this case, since the number of parts increases in the production process, the cost increases accordingly. Further, a user must have two types of 3-port valves in order to change the flowpassages of NO type and NC type. This increases extra expenses for storage of 3-port valves not used, thus increasing an economical burden.

FIG. 41 shows a fourth conventional embodiment of a 3-port valve manifold proposed in order to overcome the problem noted above with respect to the third prior art. Here, with respect to the same shape of spools, that is, the same 3-port valve, the direction of the valve is changed whereby the change of flowpassage from the NO type to the NC type can be done. That is, in FIG. 41, 3-port valves 320a and 320b are the same article, and there are used 320a as the NC type 3-port valve, and 320b as the NO type 3-port valve. When the air port and the exhaust port when being used as the NO type are used as the NC type, they function as the exhaust port and the air port, respectively. Thereby, the problem encountered in the third prior art can be overcome by this manifold.

However, recently, when the air pressure switching valve is used at a place where high accuracy is required particularly such as the production line of semiconductors, the conventional manifolds pose the following problems.

First, in the second conventional embodiment, the 5-port valve is used in order to use the air pressure switching valve having two output ports. Therefore, if two output ports are necessary, the manifold is constituted by the 5-port valve as a main. Accordingly, the dimension of the manifold is so restricted by the shape dimension of the 5-port valve that cannot be further miniaturized. Therefore, in the case where it cannot be installed adjacent to working apparatuses, the connection line becomes long, bringing forth the lowering of a switching responsiveness. Further, since a dead space is present in the 3-port valve, it is difficult to further improve the responsiveness of the air pressure switching valve.

Even if the manifold is constituted mainly by the 4-port valve, the manifold base is small in dimension but since the 4-port valve is the same in outside diameter as that of the 5-port valve, the manifold cannot be miniaturized.

Second, since pilot air is supplied from the main source, a combination of air pressure and vacuum cannot be used as a working fluid. If a combination of air pressure and vacuum is used, an external pilot is necessary. Further, for concentratedly processing pilot air, the manifold requires an air port and an exhaust port for pilot air, further increasing the dimension of the manifold.

Third, in the fourth conventional embodiment, the direction of the whole valve is changed by 180 degrees in order that the change of flowpassages of NO type and NC type is carried out by one and the same 3-port valve. Therefore, a pilot air control valve is reversed in position to pose a problem in that the dimension of the manifold becomes large. Further, in the case where a concentrated supply of pilot air is carried out in the manifold, two pilot air ports are necessary in a 3-port valve.

This problem encountered in the fourth conventional embodiment can be overcome by the third conventional embodiment. That is, the problems of the respective conventional embodiments are contrary to each other.

SUMMARY OF THE INVENTION

The present invention has been achieved in order to solve the aforementioned problems. It is an object of the present invention to provide a manifold wherein a manifold in which two on-off valves or more different in the number of output ports or output types are provided on the manifold can be formed into a smaller type, pipe saving, easy maintenance and management, improvement in responsiveness and individual supply and exhaust of air.

For achieving the aforementioned object, the manifold according to the present invention has the following constitution.

According to a first aspect of the present invention, there is provided a manifold comprising a supply port, an exhaust port and an output port in which two on-off valves or more different in the number of the output ports or output types are mounted on a manifold base, wherein said two on-off valves or more are mounted on said manifold base in the same direction, and the distance from said manifold base to the outside of said two on-off valves or more is constant.

According to a second aspect of the present invention there is provided a manifold according to the first aspect, wherein said on-off valve comprises a 3-port valve provided with a supply port, an exhaust port and an output port, and a 4-port valve provided with a supply port, an exhaust port and two output ports, said 4-port valve being formed by a combination of said 3-port valve.

The manifold of the first and second aspects has the function as follows:

The 4-port valve is constituted by the 3-port valve whereby the 4-port valve can be mounted on the manifold base constituted mainly by the 3-port valve. Therefore, in the manifold provided with the 3-port valve and the 4-port valve, the distance from the manifold base to the outside of the 3-port valve and the 4-port valve is constant. Further, since the 3-port valve comprises a main body, the output ports can be arranged linearly. Thereby, the miniaturization and pipe saving can be achieved, and the maintenance and management are facilitated. Furthermore, there is no dead space of the 3-port valve mounted on the manifold constituted mainly by the 5-port valve, thus improving the switching responsiveness.

According to a third aspect of the present invention, there is provided a manifold according to the first aspect, wherein said on-off valve comprises a pilot air control valve for controlling pilot air and a pilot type switching valve constituted by a combination of a poppet valve driven by said pilot air or a spool valve, and an NO type 3-port valve in which normally a supply port is communicated with an output port and an NC type 3-port valve in which normally, an output port is communicated with an exhaust port, said NO type 3-port valve and said NC type 3-port valve being constituted by the same constructional parts.

The manifold of the third aspect has the function as follows: That is, in the 3-port valve, a poppet valve or a spool valve as a main valve is rotated by 180 degrees, whereby flowpassages of NO type and NC type can be changed by using the same shape of a poppet or a spool. Accordingly, the NO type and NC type 3-port valves are constituted by the same constructional parts whereby the cost can be reduced by a common use of parts in terms of manufacture. Further, for a user, the maintenance and management are facilitated.

DESCRIPTION OF THE PREFERRED EMBODIMENTS

The manifold according to the present invention will be described in detail by way of concrete embodiments with reference to the drawings.

Figure 1:
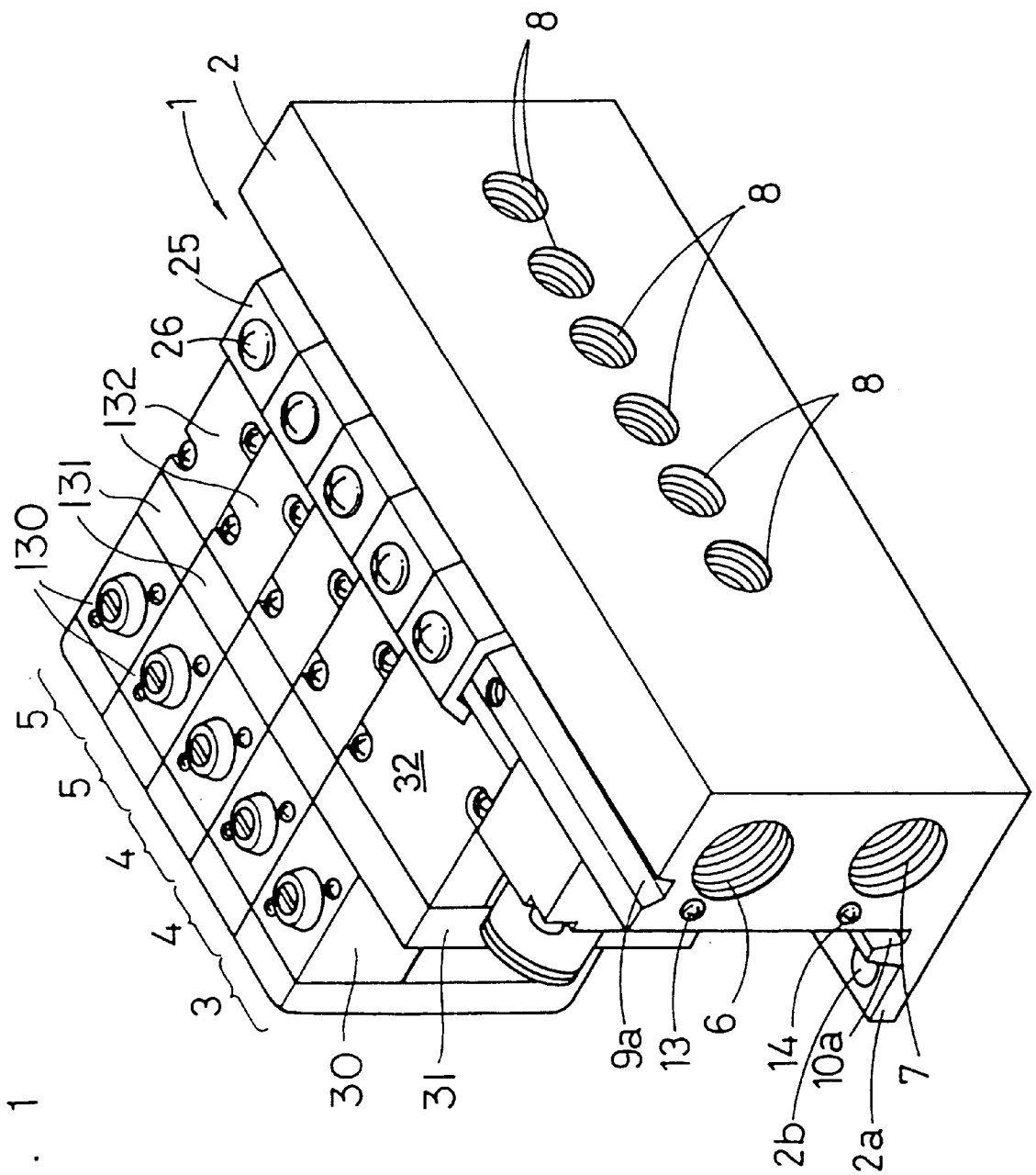
FIG. 1 is a perspective view of a manifold according to the present invention.

FIG. 1 is a perspective view of a manifold having a 3-port solenoid valve, and a 4-port solenoid valve mounted thereon according to an embodiment of the present invention. In FIG. 1, a manifold 1 comprises a manifold base 2, a 4-port solenoid valve 3, NO type 3-port solenoid valves 4, and NC type 3-port solenoid valves 5. The solenoid valves and the manifold base 2 are mounted by fixing fittings 25 and fixing screws 26. The manifold base 2 is in the shape of a rectangular parallelopiped, and a common air flowpassage 6, a common exhaust flowpassage 7, an external pilot flowpassage 13 and a pilot exhaust flowpassage 14 extend through the manifold base 2 in a longitudinal direction. Further, output ports 8 perpendicular to the longitudinal direction extend through the manifold base 2 between the common air flowpassage 6 and the common exhaust flowpassage 7, and between the external pilot flowpassage 13 and the pilot exhaust flowpassage 14 without intersecting the respective flowpassages. Connecting recesses 9a and 10a are formed in the longitudinal direction for connection with the 3-port solenoid valve or the like.

Figure 2:
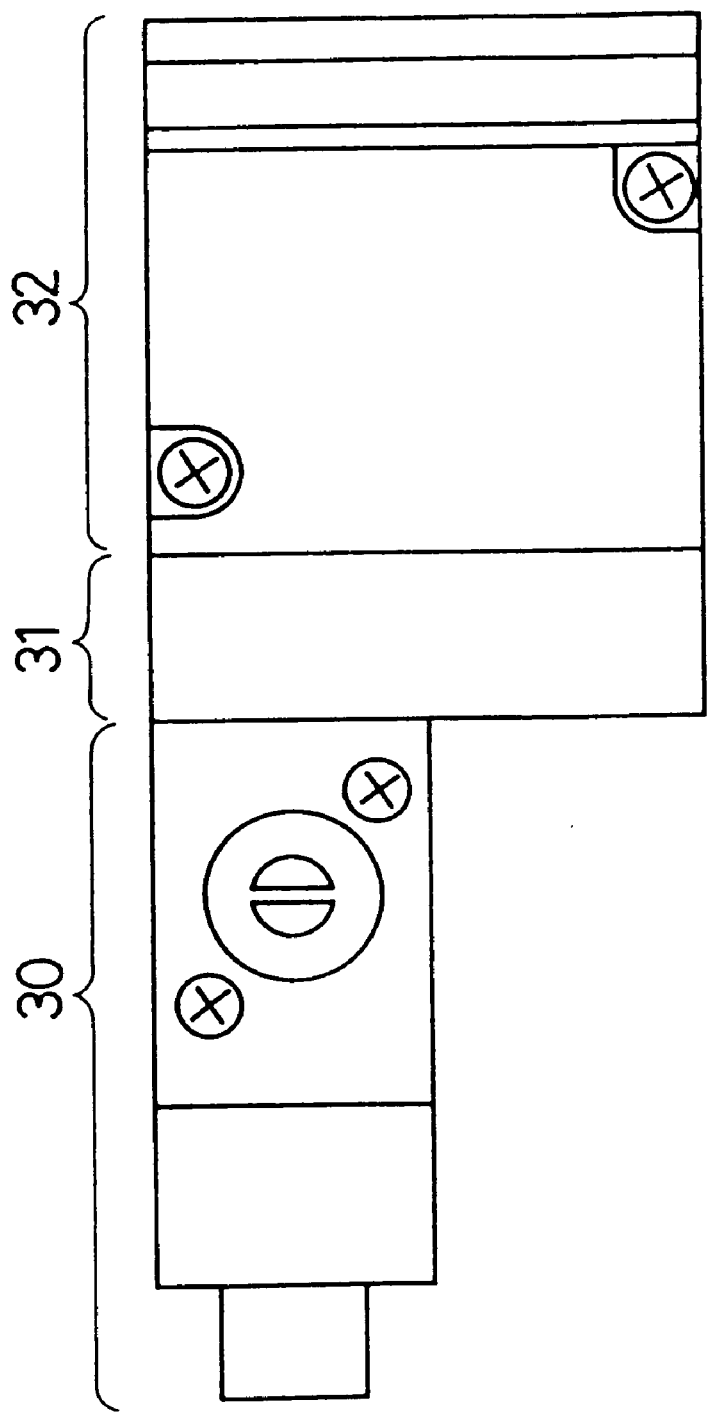
FIG. 2 is a top view of a 4-port solenoid valve which is a part of the manifold according to the present invention.
Figure 3:
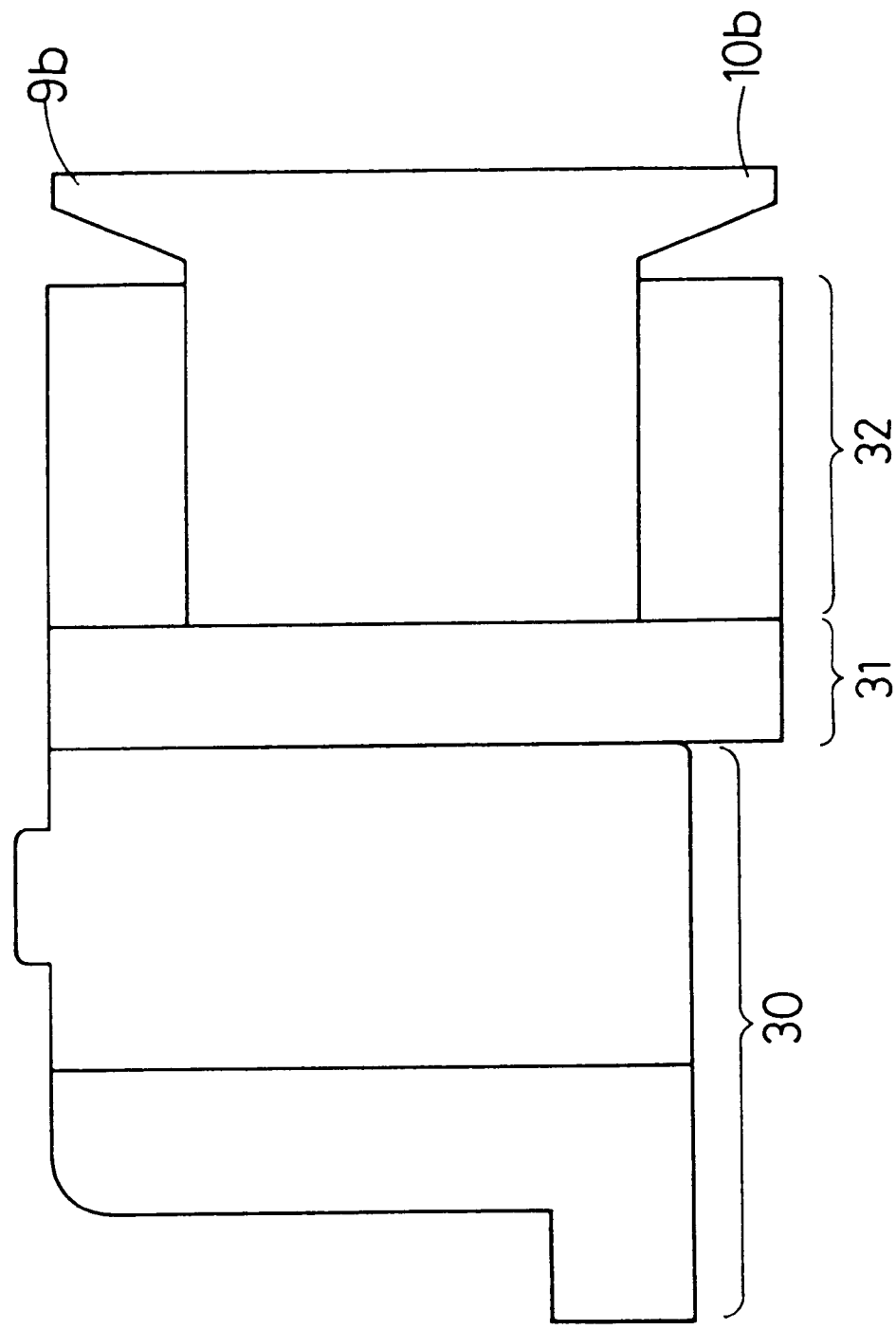
FIG. 3 is a side view of a 4-port solenoid valve which is a part of the manifold according to the present invention.

In the ensuing description, the 4-port solenoid valve 3 is described in detail with reference to FIGS. 2–17 of the drawings. The details of the 3-port solenoid valves 4 and 5 will be described later with reference to FIGS. 18–33. FIGS. 2 and 3 are respectively views with the portion of the 4-port solenoid valve 3 of the manifold extracted. FIG. 2 is a top view of the 4-port solenoid valve 3, and FIG. 3 is a side view of the same. The 4-port solenoid valve 3 comprises a pilot type solenoid valve 30, pneumatic switching valve body 32, and a plate-like connecting plate 31 for connecting them, as shown in FIG. 2, seal gaskets being mounted on the respective connection surfaces to prevent air from leaking.

As shown in FIG. 3, connecting convex portions 9b and 10b are formed in the connection portions with the manifold base 2. One side 10b of the connecting convex portion is fitted in the connecting recess 10a shown in FIG. 1, and the fixing fitting 25 is placed in engagement with the other side 9b of the connecting convex portion. Then, the solenoid valves are fixed by fastening the fixing screws 26 from the top. Since the mounting and removing directions of the fixing screws 26 are substantially the same as the mounting and removing directions, even when they are mounted in a narrow space of the solenoid, the mounting and removing can be done easily.

Further, since the mounting surface of the manifold base 2 has the extending portion 2a, and the extending portion 2a is formed with the mounting hole 2b, the manifold base 2 can be removed and mounted in the same direction as that of the solenoid valve.

Figure 4:
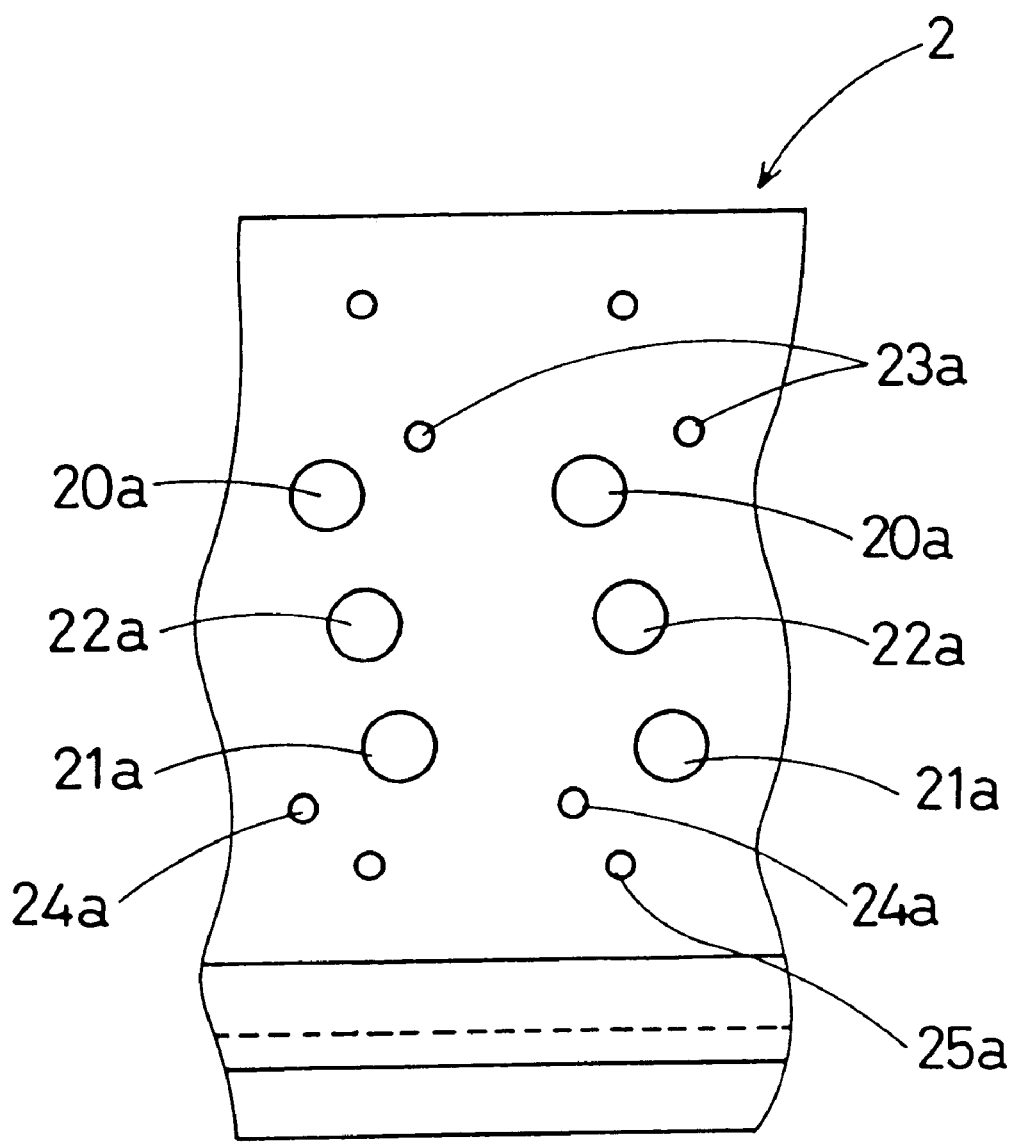
FIG. 4 is a front view of a connection surface on the manifold base side of a 4-port solenoid valve portion of the manifold according to the present invention.
Figure 5:
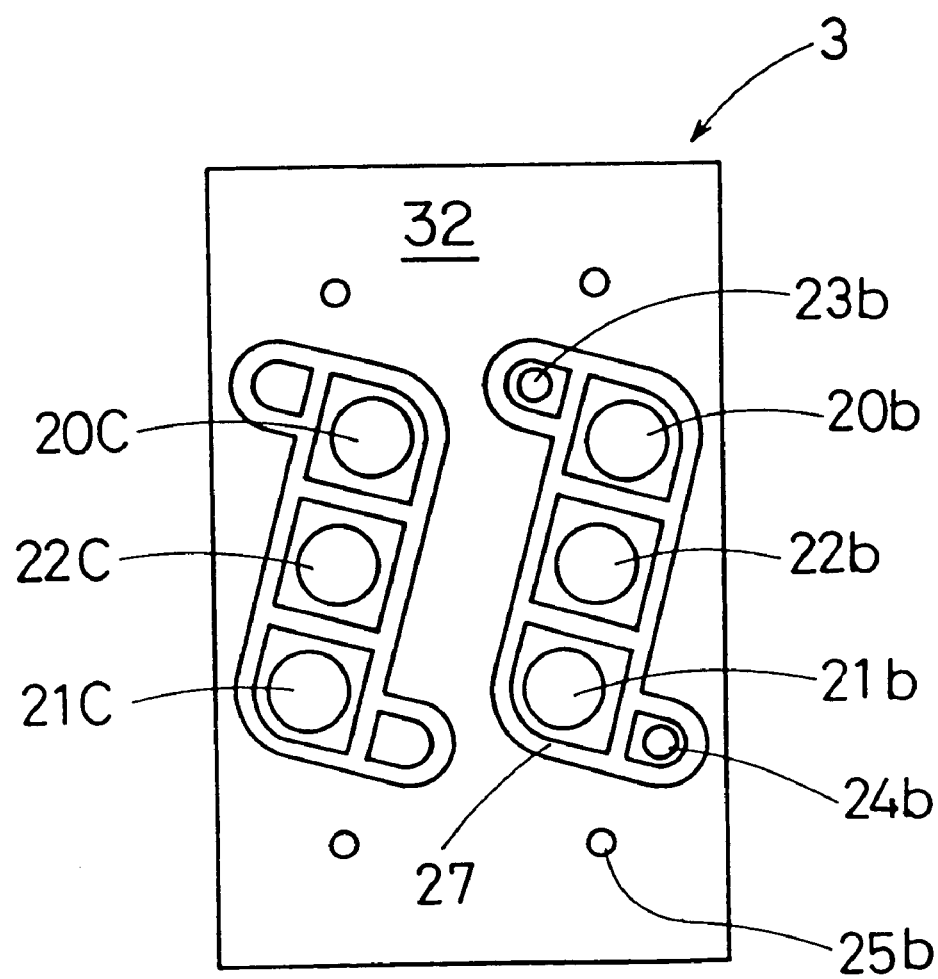
FIG. 5 is a front view of a connection surface on the 4-port solenoid valve side of a 4-port solenoid valve portion of the manifold according to the present invention.

FIGS. 4 and 5 show a connection surface between the manifold base 2 and the 4-port solenoid valve 3. FIG. 4 is a front view of the connection surface on the manifold base 2 side, and FIG. 5 is a front view of the connection surface on the 4-port solenoid valve 3 side. The connection surface on the manifold base 2 side is formed with air ports 20a serving as supply ports, exhaust ports 21a, output ports 22a, pilot air ports 23a, pilot exhaust ports 24a, and connecting pins 25a, as shown in FIG. 4.

On the other hand, the connection surface on the 4-port solenoid valve 3 side is also formed with air ports 20b and 20c serving as supply ports, exhaust ports 21b and 21c, output ports 22b and 22c, a pilot air port 23b, a pilot exhaust port 24b, and a connecting pin receptacle 25b, as shown in FIG. 5.

A method for mounting the 4-port solenoid valve 3 on the manifold base 2 will be described below.

In mounting the 4-port solenoid valve 3 on the manifold base 2, first, the connecting convex 10b of the 4-port solenoid valve 3 is placed in engagement with the connecting concave portion 10a of the manifold base 2.

Next, the pin receptacle 25b of the 4-port solenoid valve 3 is fitted in the connecting pin 25a of the manifold base 2.

Then, the connecting convex portion 9b of the 4-port solenoid valve 3 and the connecting concave portion 9a of the manifold base 21 are fixed by the connecting fitting 25 and the fixing screw 26 to complete connection. The ports formed in the connection surface of the manifold base 2 and the 4-port solenoid valve 3 are airtightly held by the seal gasket 27.

The 3-port solenoid valve is also mounted on the manifold base 2 similarly to the aforementioned mounting method. In this way, a number of 3-port valves and 4-port valves are mounted on the manifold base 2 to form the manifold 1.

The construction of the 4-port solenoid valve 3 which constitutes a part of the manifold will be described. As previously mentioned, the 4-port solenoid valve 3 comprises the pilot type solenoid valve 30, the pneumatic switching valve body 32, and the connecting plate 31. Their constructions will be explained.

Figure 6:
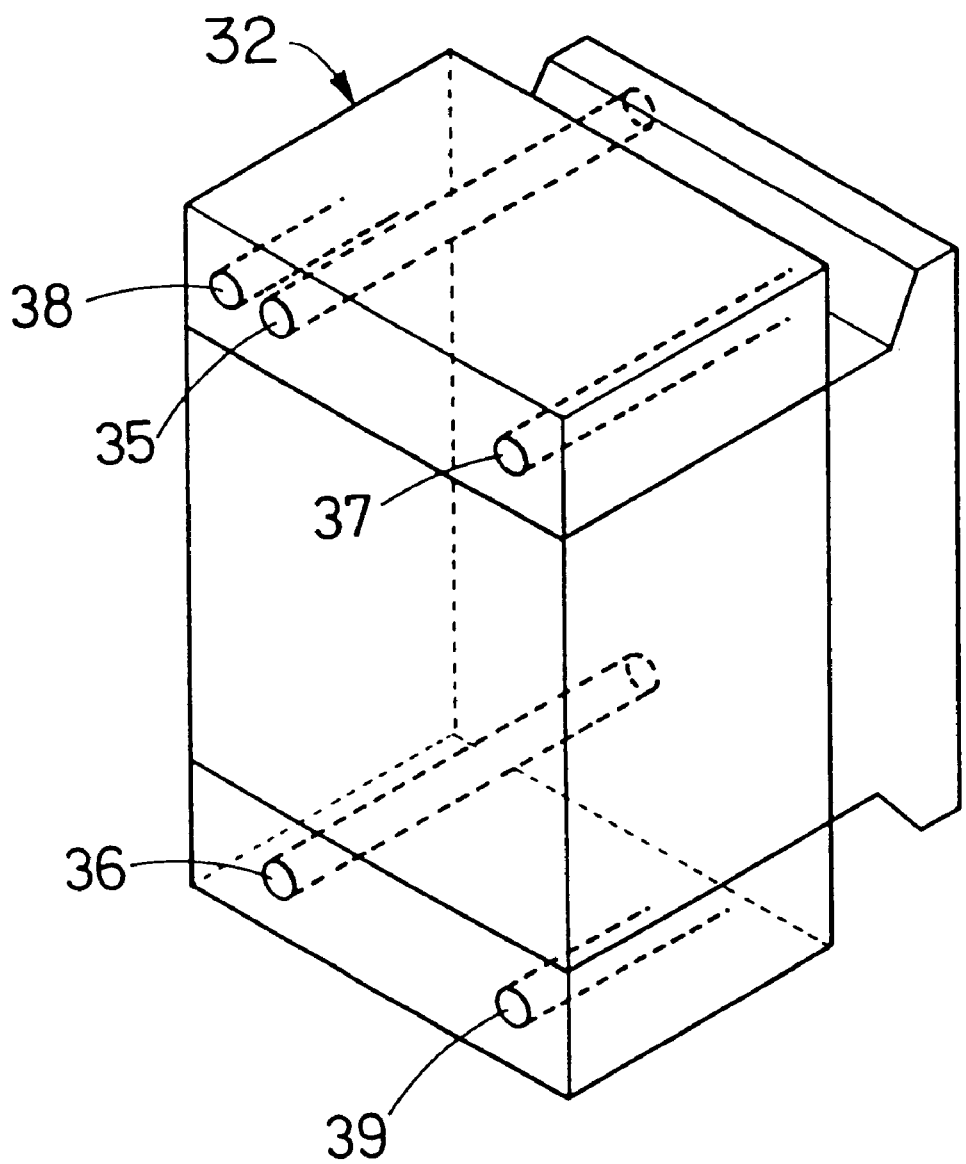
FIG. 6 is a perspective view of an air pressure switching valve body which is a constitutional part of a 4-port solenoid valve according to the present invention.
Figure 7:
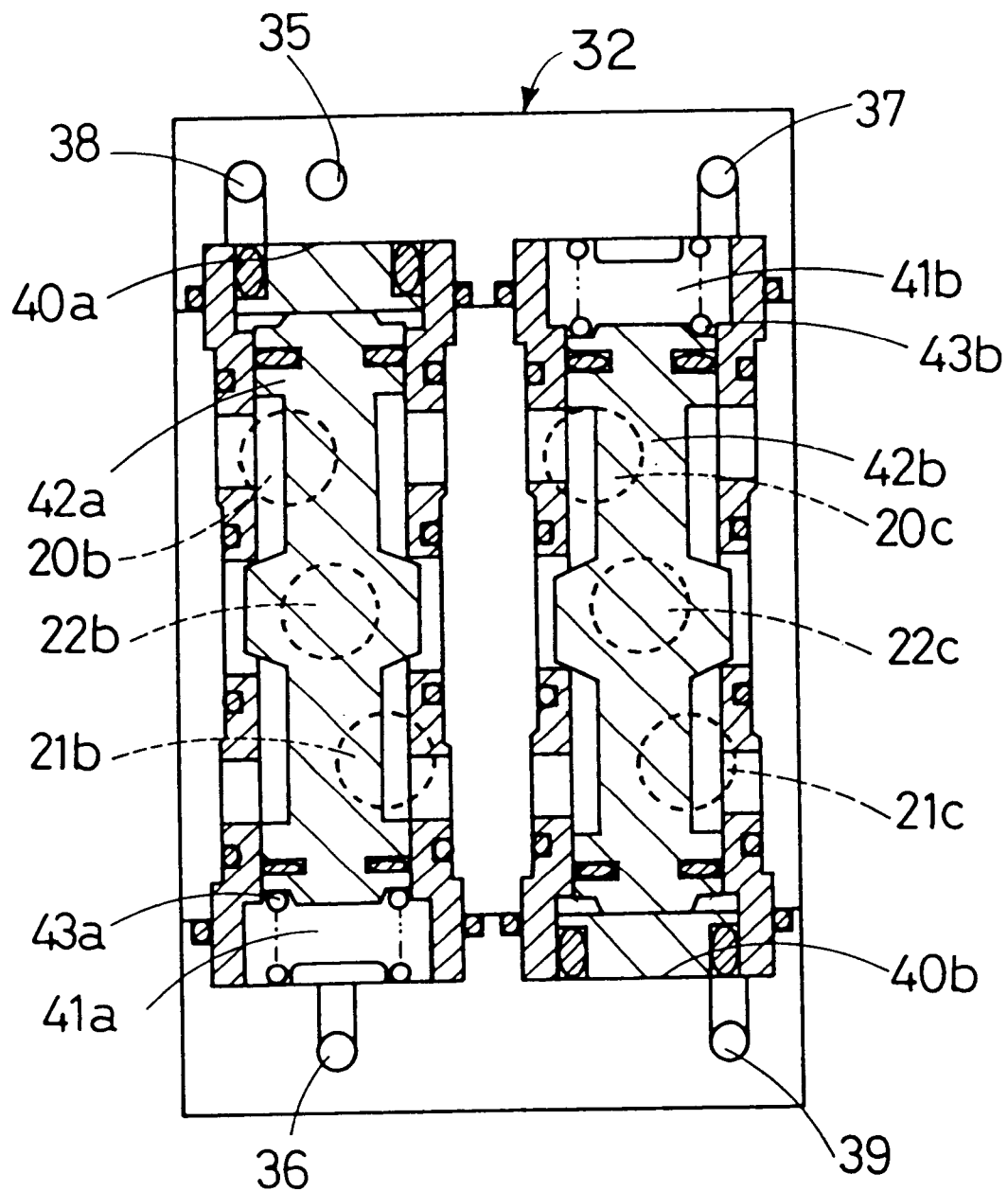
FIG. 7 is a sectional view of an air pressure switching valve body which is a constitutional part of a 4-port solenoid valve according to the present invention, showing a state where a solenoid coil is not energized.
Figure 8:
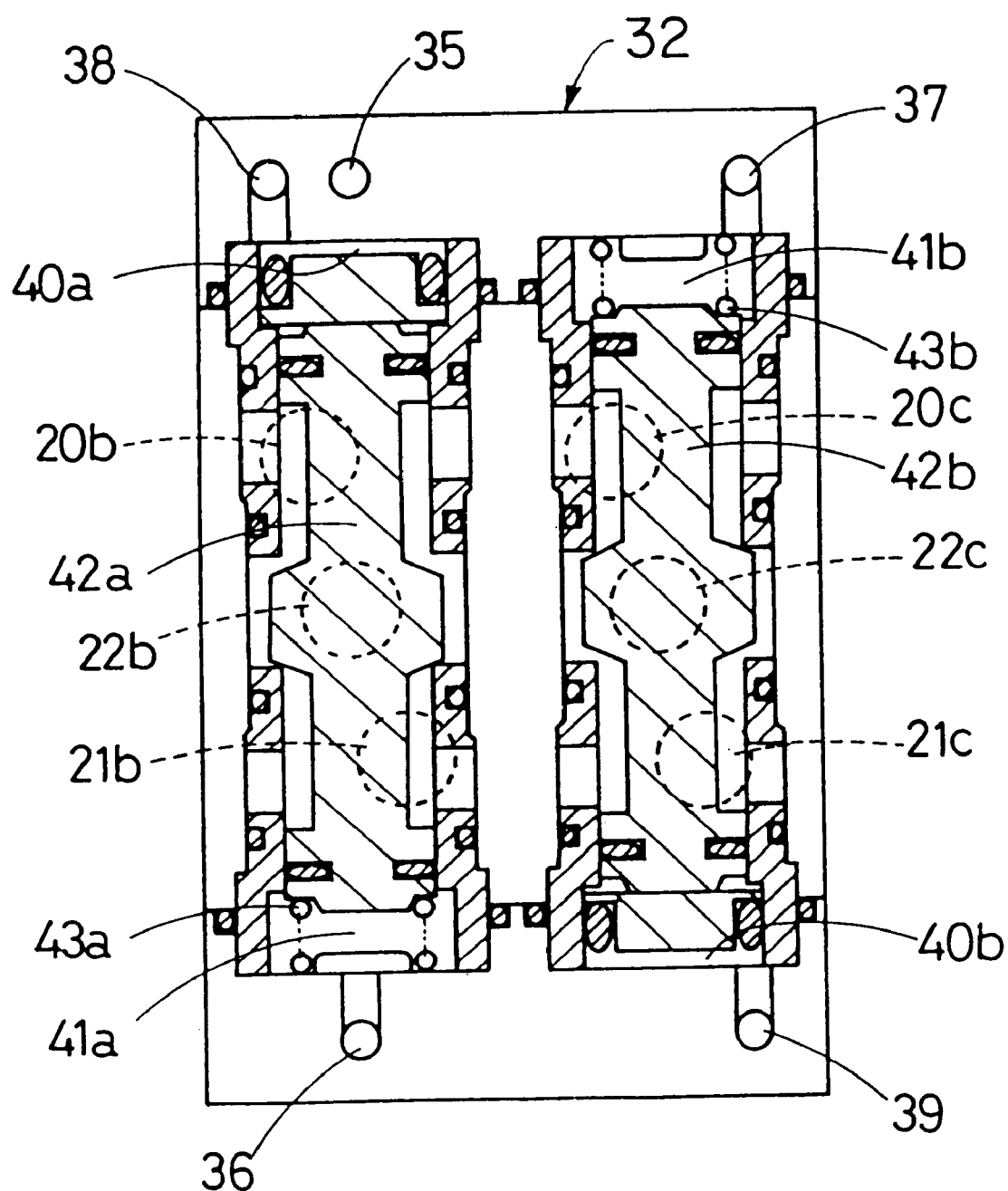
FIG. 8 is a sectional view of an air pressure switching valve body which is a constitutional part of a 4-port solenoid valve according to the present invention, showing a state where a solenoid coil is energized.

First, the construction of the pneumatic switching valve body 32 will be described with reference to FIGS. 6, 7 and 8. FIG. 6 is a perspective view of the pneumatic switching valve body 32, FIGS. 7 and 8 are sectional views of the same. FIG. 7 shows a state in which the solenoid valve is deenergized, and FIG. 8 shows a state in which the solenoid valve is energized, As shown in FIG. 6, the pneumatic switching valve body 32 is formed with extending pilot air port 35 and pilot exhaust port 36, and a pilot exhaust port 37, and pilot output ports 38 and 39 communicated with air chambers. As shown in FIG. 7, the pilot exhaust port 36, the pilot exhaust port 37, the pilot output port 38 and the pilot output port 39 are communicated with an air chamber 41a, an air chamber 41b, an air chamber 40a, and an air chamber 40b, respectively.

Further, the pneumatic switching valve body 32 houses therein two poppet valves 42a, 42b, as shown in FIG. 7, which are biased in a constant direction by means of springs 43a, 43b. The poppet valves 42a, 42b have the same construction and are arranged in a vertically reversed state. That is, in the pneumatic switching valve body 32, the switching valve body of a poppet type 3-port valve is arranged point-symmetrically. Thereby, a 4-port valve can be constituted by a combination of 3-port valves of the same type. Two output ports can be arranged linearly.

Figure 9:
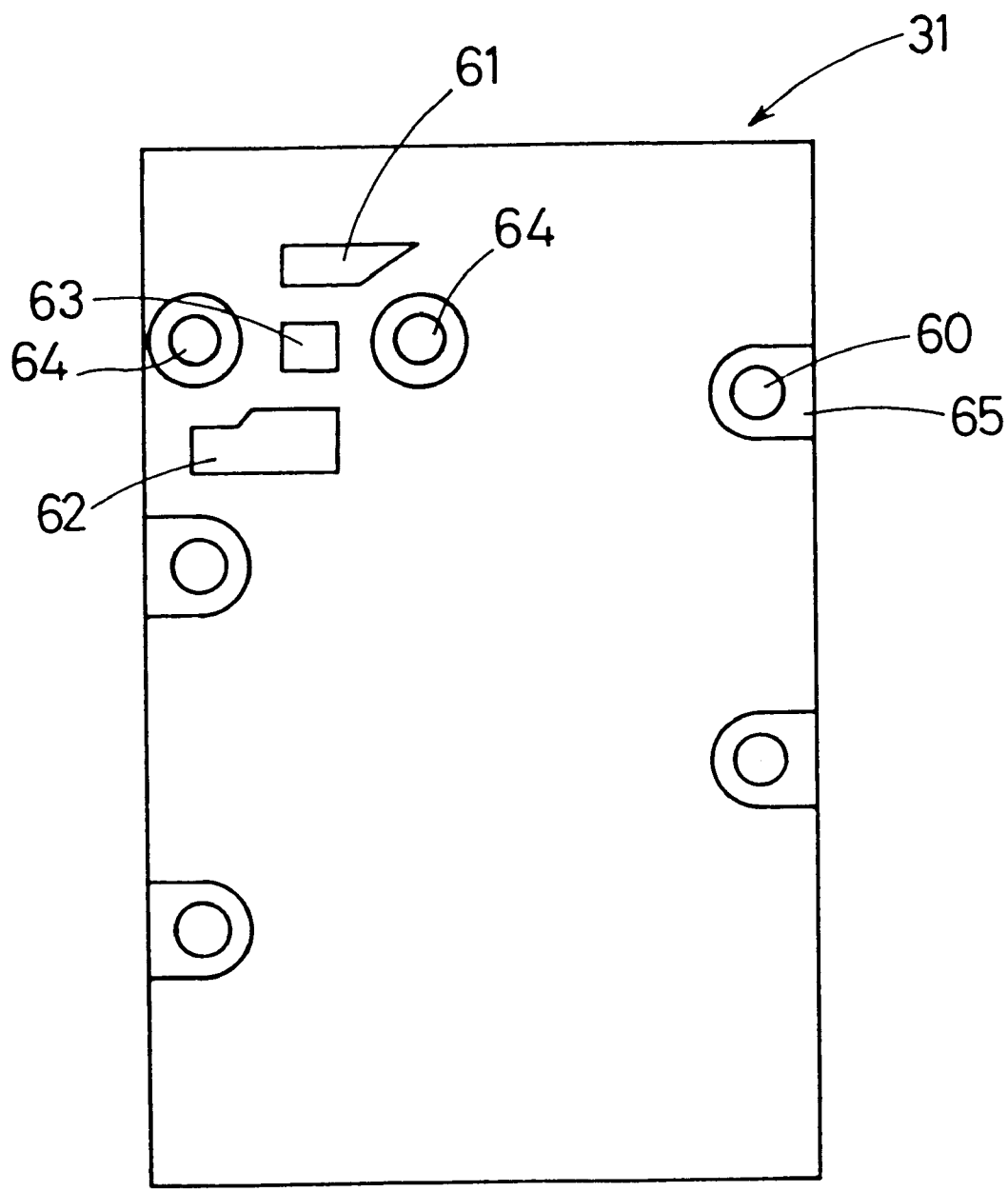
FIG. 9 is a front view of a connecting plate which is a constitutional part of a 4-port solenoid valve according to the present invention as viewed from the pilot type solenoid side.
Figure 10:
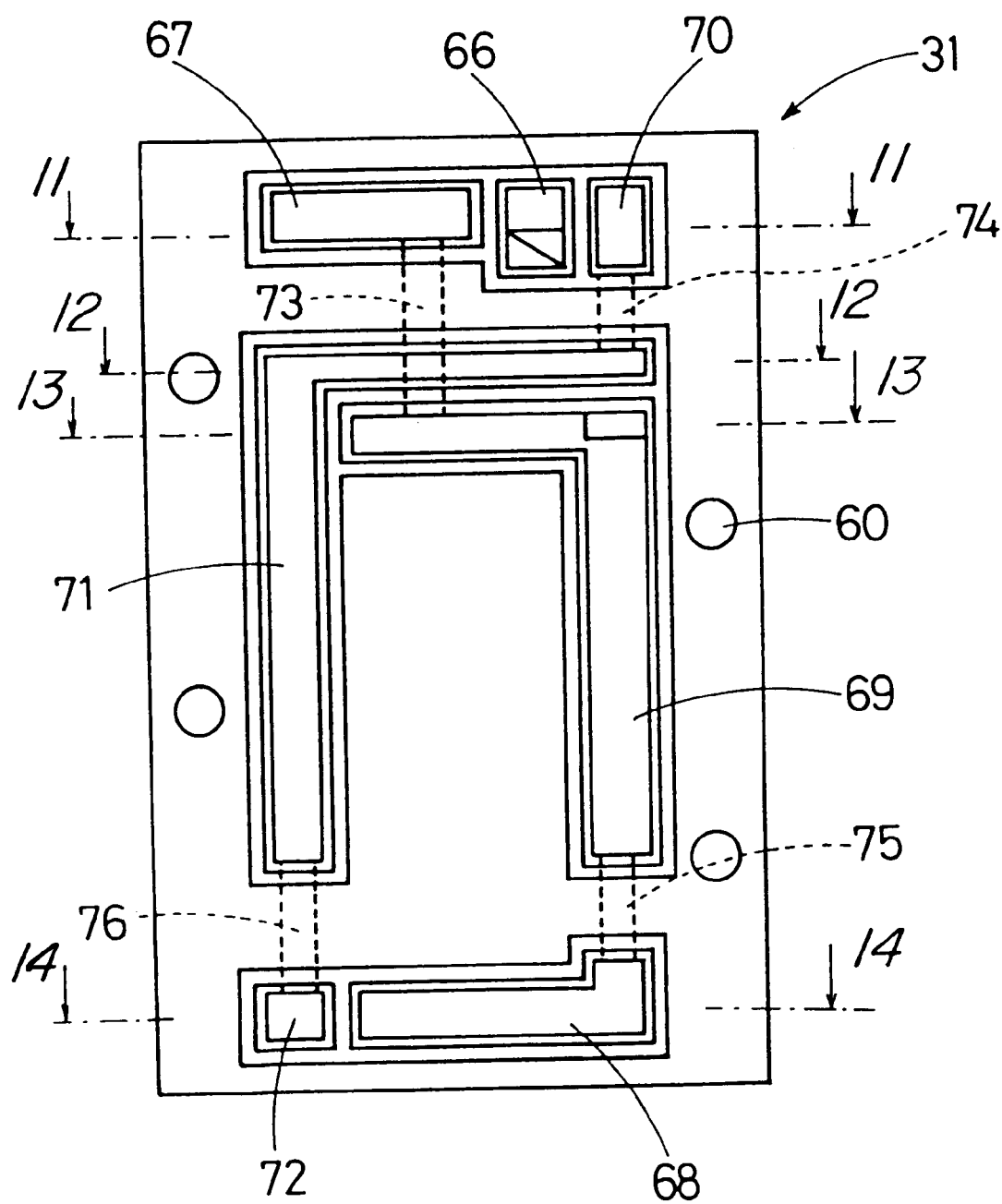
FIG. 10 is a front view of a connecting plate which is a constitutional part of a 4-port solenoid valve according to the present invention as viewed from the air pressure switching valve body side.
Figure 11:
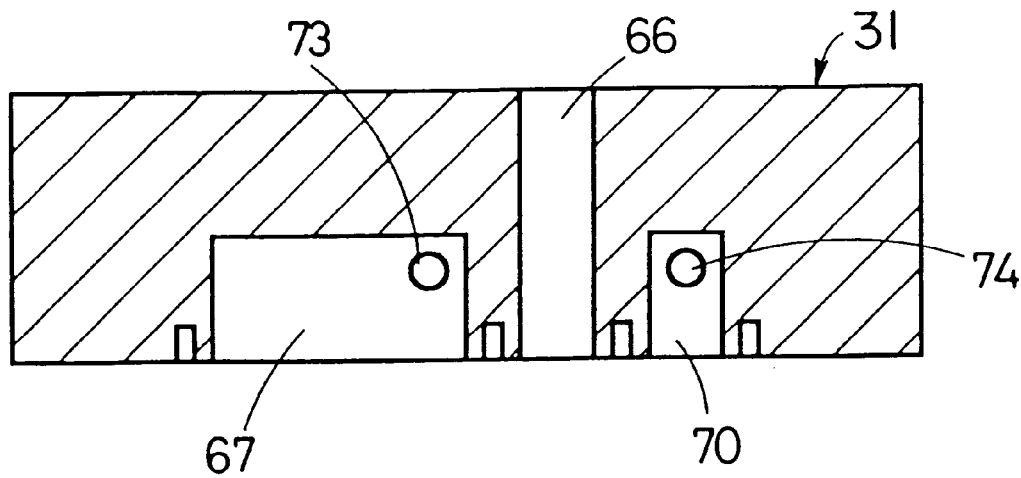
FIG. 11 is a sectional view taken on 11—11 of FIG. 10.
Figure 12:
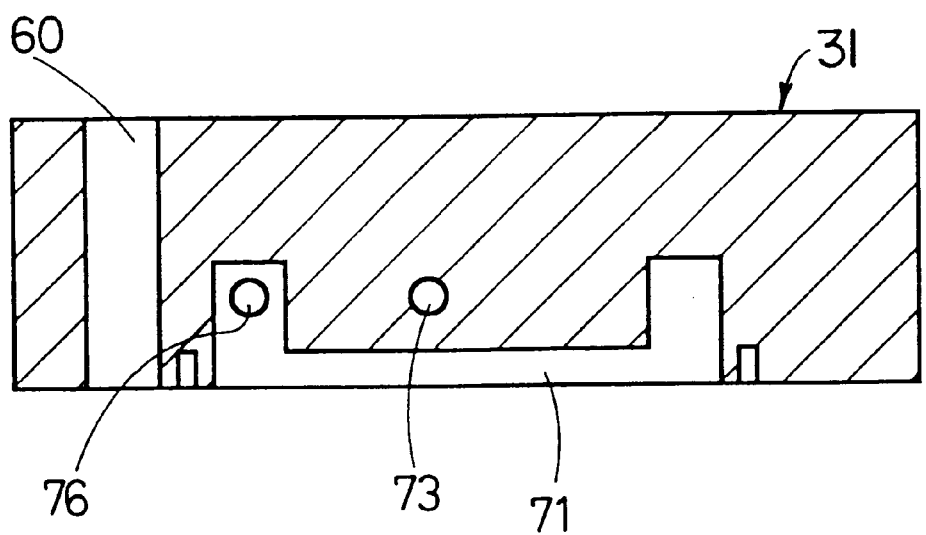
FIG. 12 is a sectional view taken on 12—12 of FIG. 10.
Figure 13:
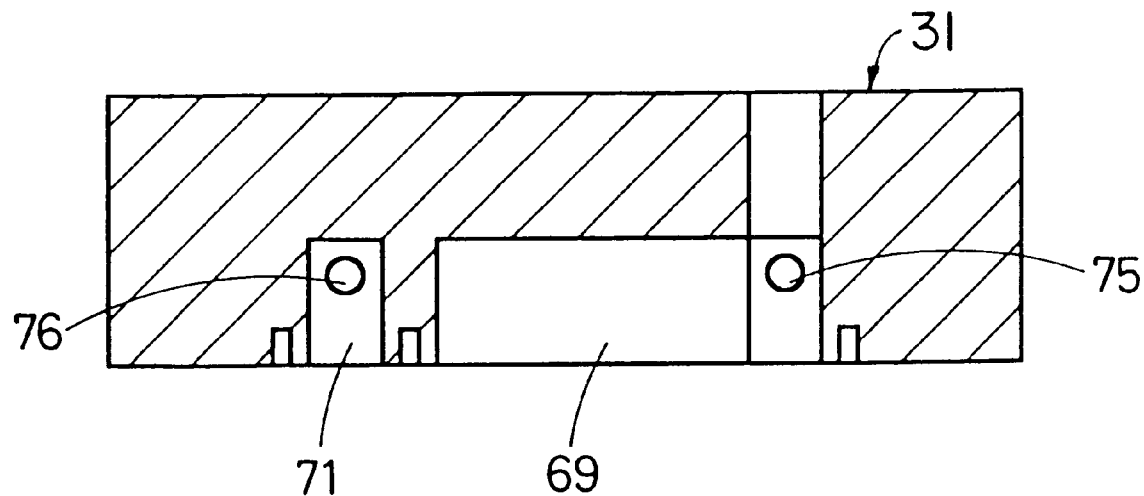
FIG. 13 is a sectional view taken on 13—13 of FIG. 10.
Figure 14:
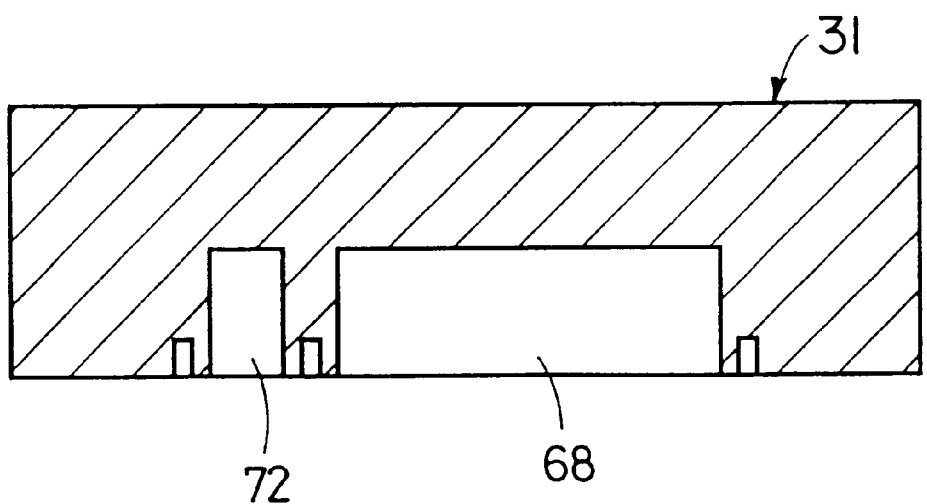
FIG. 14 is a sectional view taken on 14—14 of FIG. 10.

Next, the construction of the connecting plate 31 will be described with reference to FIGS. 9 to 14. FIG. 9 is a front view of the connecting plate 31 as viewed on the pilot type solenoid valve 30 side, and FIG. 10 is a front view of the same as viewed on the pneumatic switching valve 32 side. FIG. 11 is a sectional view taken on 11—11 of FIG. 10, FIG. 12 is a sectional view taken on 12—12 of the same, FIG. 13 is a sectional view taken on 13—13 of the same, and FIG. 14 is a sectional view taken on 14—14 of the same.

On the pilot type solenoid valve 30 side of the connecting plate 31 are formed four connecting tapped holes 60 with the pneumatic switching body 32, a pilot air port 61, a pilot exhaust port 62 and a pilot output port 63 which extend through the connecting plate 31, as shown in FIG. 9. Around the tapped hole 60 is formed a notch 65 by a head portion of the connecting screw to prevent the connecting screw from being extended. Further, there are formed two connecting internal threads 64 with the pilot solenoid valve 30.

On the other hand, on the pneumatic switching valve body 32 side of the connecting plate 31 are formed a pilot air groove 66, pilot exhaust grooves 67, 68, 69 and pilot output grooves 70, 71, 72, as shown in FIG. 10.

The grooves 66, 67, 70 provided at the upper part of the connecting plate 31 will be described. As shown in FIG. 11, the pilot air groove 66 extends through the connecting plate 31 and is communicated with the pilot air port 61. The pilot exhaust groove 67 and the pilot output groove 70 have the same depth, the pilot exhaust groove 67 and the pilot output groove 70 being communicated with a connecting passage 73 and a connecting passage 74, respectively.

Next, the grooves 71 and 69 provided in the middle of the connecting plate 31 will be described. The pilot output groove 71 is of an L shape, which depth is shallow so as to avoid the connecting passage 73, and which is communicated with the connecting passages 74 and 76, as shown in FIG. 12. The pilot exhaust groove 69 is likewise of an L-shape, a part of which extends through the connecting plate 31, as shown in FIG. 13, and which is communicated with the pilot exhaust port 62. The pilot exhaust groove 69 is communicated with the connecting passages 73 and 75.

The grooves 68 and 72 provided at the lower part of the connecting plate 31 will be described. As shown in FIG. 14, the pilot exhaust groove 68 and the pilot output groove 72 have the same depth, the pilot exhaust groove 68 and the pilot output groove 72 being communicated with the connecting passages 75 and the connecting passage 76, respectively.

As described above, the connecting plate 31 is formed with three flowpassages. That is, for air of pilot air, the pilot air port 61 and the pilot air groove 66 are communicated; for exhaust, the pilot exhaust port 62 and the pilot exhaust grooves 67, 68 are communicated, and for output, the pilot output port 63 and the pilot output grooves 70, 72 are communicated. Thereby, by the provision of the connecting plate 31, it is possible to control pilot air by a single solenoid valve.

The construction of the pilot type solenoid valve 30 will be described with reference to FIGS. 15, 16 and 17.

Figure 15:
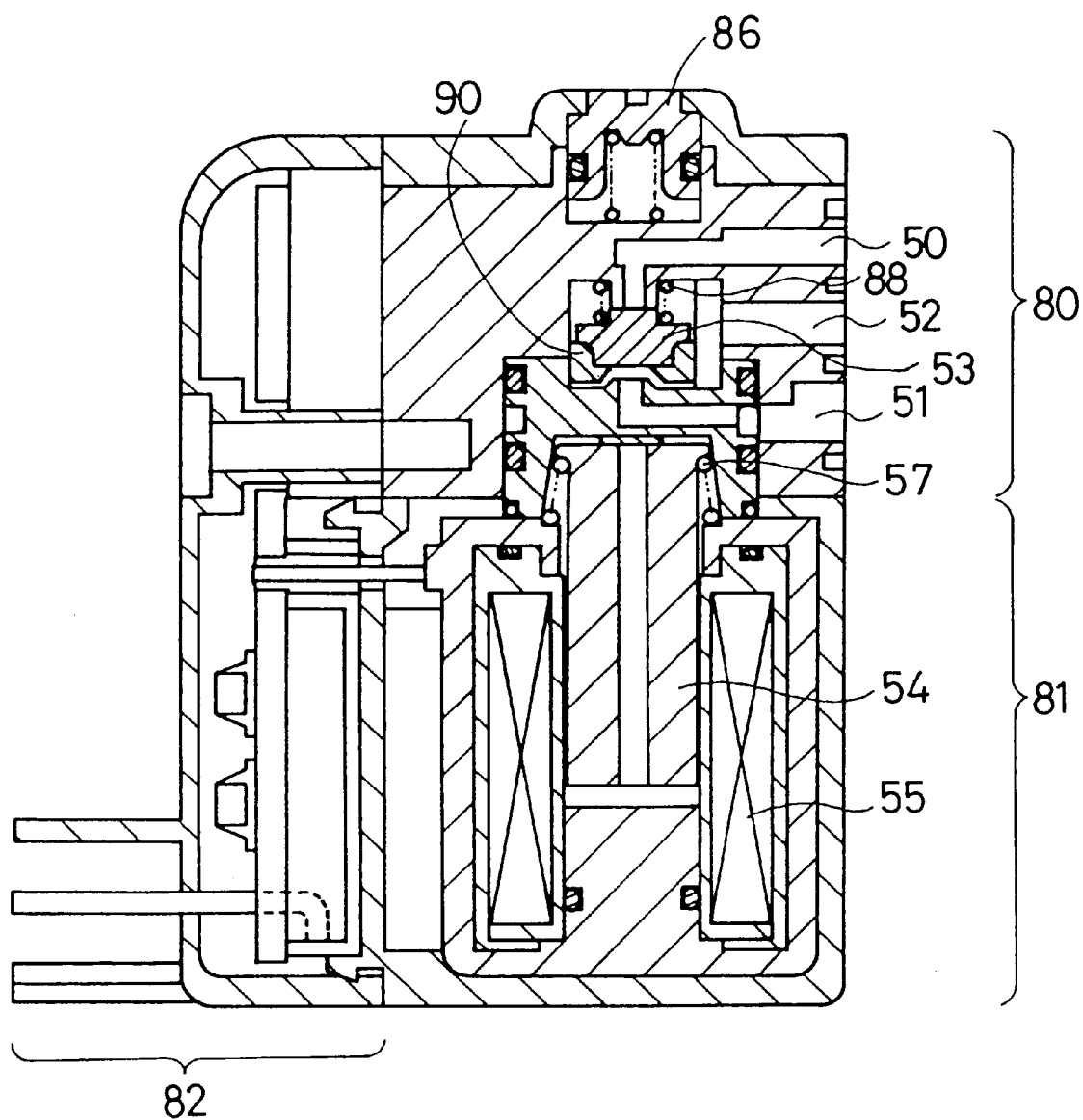
FIG. 15 is a sectional view of a pilot type solenoid valve which is a constitutional part of a 4-port solenoid valve according to the present invention, showing a state where a solenoid coil is not energized.
Figure 16:
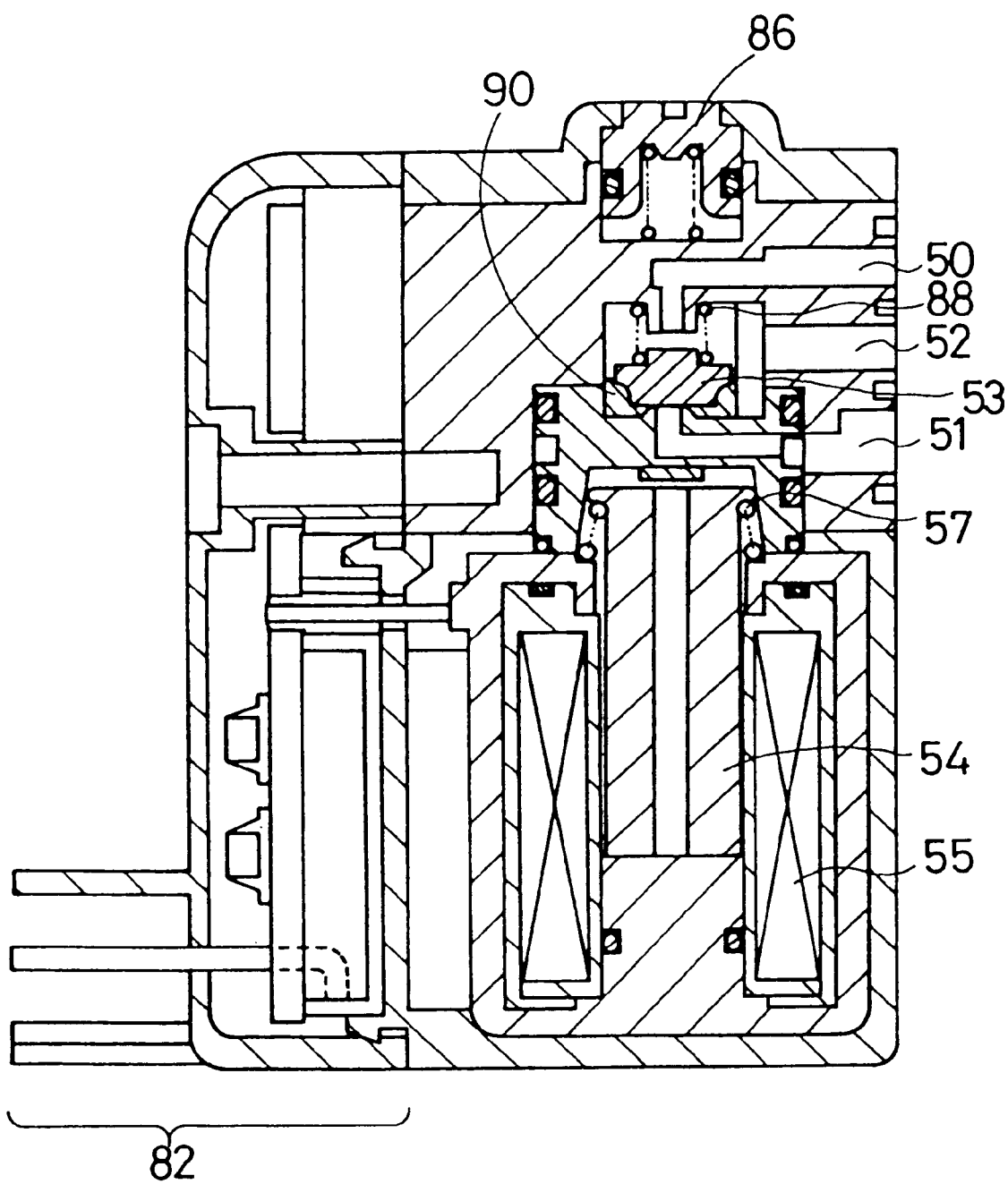
FIG. 16 is a sectional view of a pilot type solenoid valve which is a constitutional part of a 4-port solenoid valve according to the present invention, showing a state where a solenoid coil is energized.

FIGS. 15 and 16 are sectional views of the pilot type solenoid valve 30. FIG. 15 shows a deenergized state, and FIG. 16 shows an energized state. FIG. 17 is an exploded perspective view of a movable portion.

The pilot type solenoid valve 30 comprises a valve body portion 80, a coil portion 81 and an electric equipment portion 82, as shown in FIG. 15. First, the construction of the movable portion composed of the valve body portion 80 and the coil portion 81 will be described with reference to FIG. 17. The movable portion is formed with a manual switch upward and a switching valve portion downward about a valve body block 83. The manual switch is constructed such that a manual button 86 is inserted into the valve body block 80 through a manual pin 84 and a spring 85, and a lid 87 is mounted. The switching valve portion is constructed such that a valve 53, a valve guide 90 and a valve seat 89 are integrated through a spring 88, and a valve body block 83 is inserted from the bottom. The coil portion 81, in which a plunger 54 is inserted into an electromagnet 91 through a spring 57, is connected to the valve body portion 80 to constitute the movable portion. The valve body block 83 is formed with a pilot air flowpassage or a pilot air port 50, a pilot exhaust port 51 and a pilot output port 52, as shown in FIG. 15.

The movable portion constructed as described above operates as follows. First, in a state where the coil 55 is deenergized, the plunger 54 is biased upward by means of the spring 57, as shown in FIG. 15. At this time, since the force from the plunger 54 is stronger than that of the spring 88, the valve guide 90 and the valve 53 are pressed upward by the plunger 54. Thereby, as a flowpassage of pilot air, the pilot output port 52 and the pilot exhaust port 51 are communicated.

When the coil 55 is energized, the plunger 54 overcomes the force of the spring 57 and moves downward, as shown in FIG. 16. Then, the valve 53 and the valve guide 90 are moved downward by the spring 88. Accordingly, the flowpasage of the pilot air is switched so that the pilot air port 50 and the pilot output port 52 are communicated.

The operation by way of the manual button is as follows. when the manual button 86 is depressed, the valve 53 is moved through the manual pin 84 so that the flowpassage of the pilot air is switched.

The flowpassage of operating air in the 4-port solenoid valve 3 constructed by parts described above will be described. First, a description is made in a state where the coil 55 is deenergized. With respect to a main flowpassage, as shown in FIG. 7, the output port 22b and the exhaust port 21b of the pneumatic switching valve body 32 are communicated, and the air port 20c and the output port 22c are communicated.

Air supplied to the pilot air port 13 of the manifold base 2 passes through the pilot air port 35 of the pneumatic switching valve body 32, the pilot air port 61 of the connecting plate 31 and the pilot air groove 66, and thence flow into the pilot air port 50 of the pilot type solenoid valve 30. At this time, as shown in FIG. 15, since the pilot air port 50 is closed by the valve 53, the pilot air stays thereat.

Next, a description is made in a state where the coil 55 is energized. As previously mentioned, when the coil 55 is energized, the plunger 54 is moved downward by attraction of the coil 55, whereby the valve 53 also moves downward. By the downward movement of the valve 53, the pilot air port 50 and the pilot output port 52 are communicated. Then, the pilot air flows from the pilot output port 52 to the pilot output port 63 of the connecting plate 31. Within the connecting plat 31, the air flows from the pilot output port 63 to the pilot output groove 71, as shown in FIG. 10. Thence, the air passes through the pilot output grooves 70 and 72 through the connecting passages 74 and 76, and flows into the pilot output ports 38 and 39 of the pneumatic switching valve body 32. Since the pilot output ports 38 and 39 are communicated with the air chambers 40a and 40b, respectively, pilot air is supplied to the air chambers 40a and 40b. As a result, air pressure overcomes the springs 43a and 43b to move the poppet valves 42a and 42b.

Thereby, as shown in FIG. 8, the air port 20b and the output port 22b are communicated, and the output port 22c and the exhaust port 21c are communicated so that the main flowpassage is switched.

When the coil 55 is deenergized, a supply of pilot air is stopped at the pilot air port 50 by the valve 53 within the pilot type solenoid valve 30. Thereby, no supply of pilot air to the air chambers 40a and 40b in the pneumatic switching valve body 32 exists, and the poppet valves 42a and 42b are returned to their original positions by the springs 43a and 43b. The main flowpassage is again switched so that the output port 22b and the exhaust port 21b are communicated, and the air port 20c and the output port 22c are communicated.

On the other hand, pilot air remained in the air chambers 40a and 40b is exhausted outside through the following channel. First, the pilot air passes through the pilot output ports 38 and 39, and flows into the pilot output grooves 70 and 72 of the connecting plate 31. Then, the air flows into the pilot type solenoid valve 30 from the pilot output port 63 by the flowpassage formed within the connecting plate 31. Within the pilot type solenoid valve 30, the air flows from the pilot output port 52 to the pilot exhaust port 51, and again returns to the connecting plate 31. After this, the air flows into the exhaust port 36 of the pneumatic switching valve body 32 by the flowpassage formed within the connecting plate 31, and is discharged outside passing through the pilot exhaust port 14 of the manifold base 2.

As described above, the combination of two 3-port valves provides the switching function of the 4-port valve, and the control of pilot air for driving the 3-port valve is achieved by a single pilot type solenoid valve.

As described above, according to the manifold provided with the 3-port valve and the 4-port valve in the first embodiment, since the 3-port valves constitute the 4-port valve, the 4-port valve can be miniaturized to improve the responsiveness. Further, the 3-port valve and the 4-port valve can be provided on the manifold base mainly composed of the 3-port valve. That is, the manifold provided with the 3-port valve and the 4-port valve can be miniaturized.

Further, since the output port and the electric wiring of the solenoid valve are arranged linearly, pipe saving and wiring saving become enabled, the arrangement and maintenance properties are enhanced, and the management is facilitated.

Furthermore, the individual supply and discharge of air become enabled by the provision of the connecting plate, and as a working fluid, a combination of air pressure and vacuum can be used. The concentrated process for pilot air can be accomplished.

Next, a manifold provided with an NC 3-port valve and an NO 3 port valve according to a second embodiment will be described.

Figure 18:
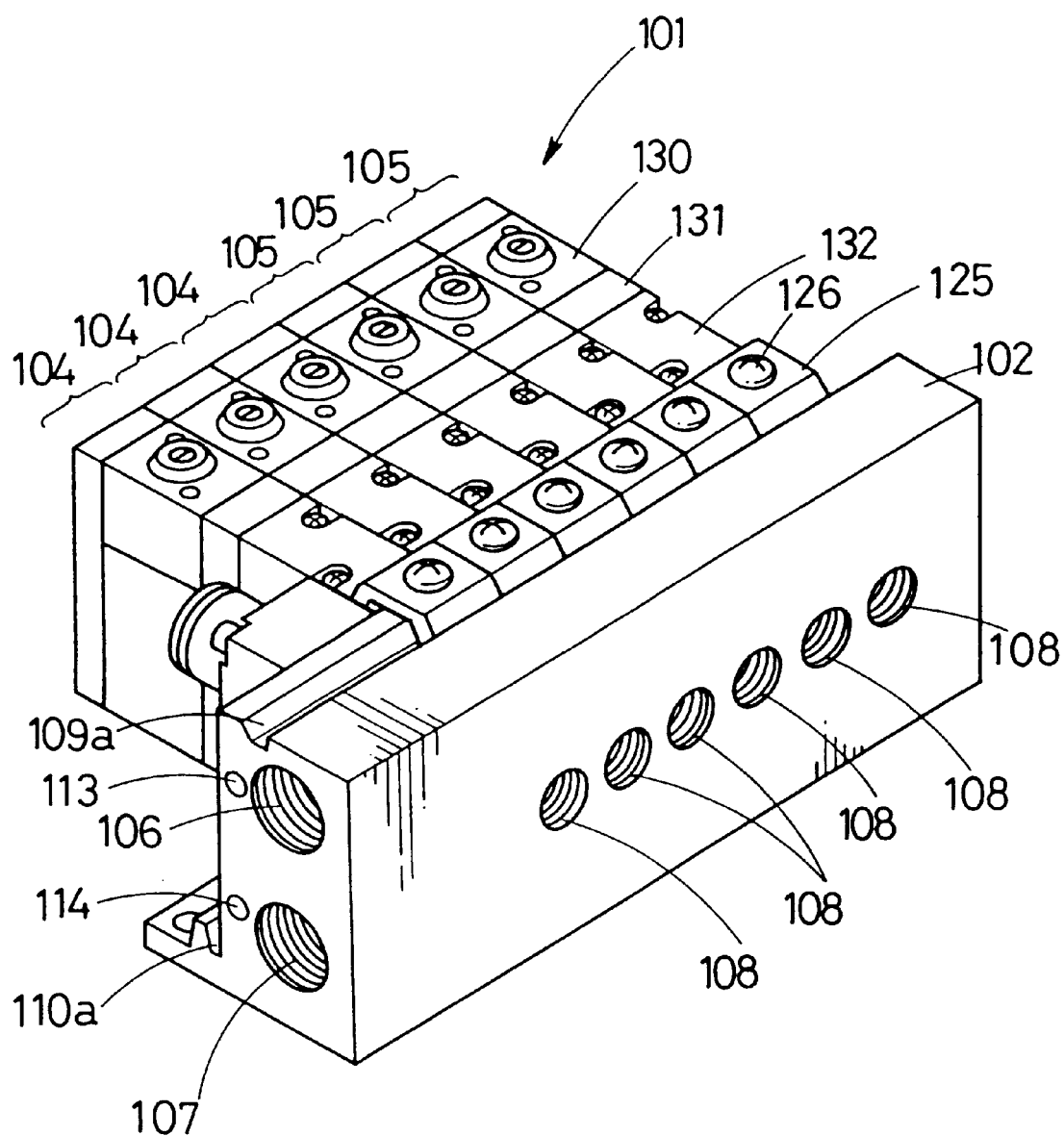
FIG. 18 is a perspective view of a manifold according to a second embodiment.

FIG. 18 is a perspective view of a manifold provided with an NO type 3-port solenoid valve and an NC type 3-port solenoid valve according to one embodiment of the present invention. In FIG. 18, a manifold 101 comprises a manifold base 102, an NO type 3-port solenoid valve 104 and an NC type 3-port solenoid valve 105. The solenoid valves and the manifold base 102 are mounted by fixing fittings 125 and fixing screws 126. The manifold base 102 is in the shape of a rectangular parallelopiped, and a common air flowpassage 106, a common exhaust flowpassage 107, an external pilot flowpassage 113 and a pilot exhaust flowpassage 114 extend through the manifold base 102 in a longitudinal direction. Further, output ports 108 perpendicular to the longitudinal direction extend through the manifold base 102 between the common air flowpassage 106 and the common exhaust flowpassage 107, and between the external pilot flowpassage 113 and the pilot exhaust flowpassage 114 without intersecting the respective flowpassages. Connecting recesses 109a and 110a are formed in the longitudinal direction for connection with the 3-port solenoid valve or the like.

Figure 19:
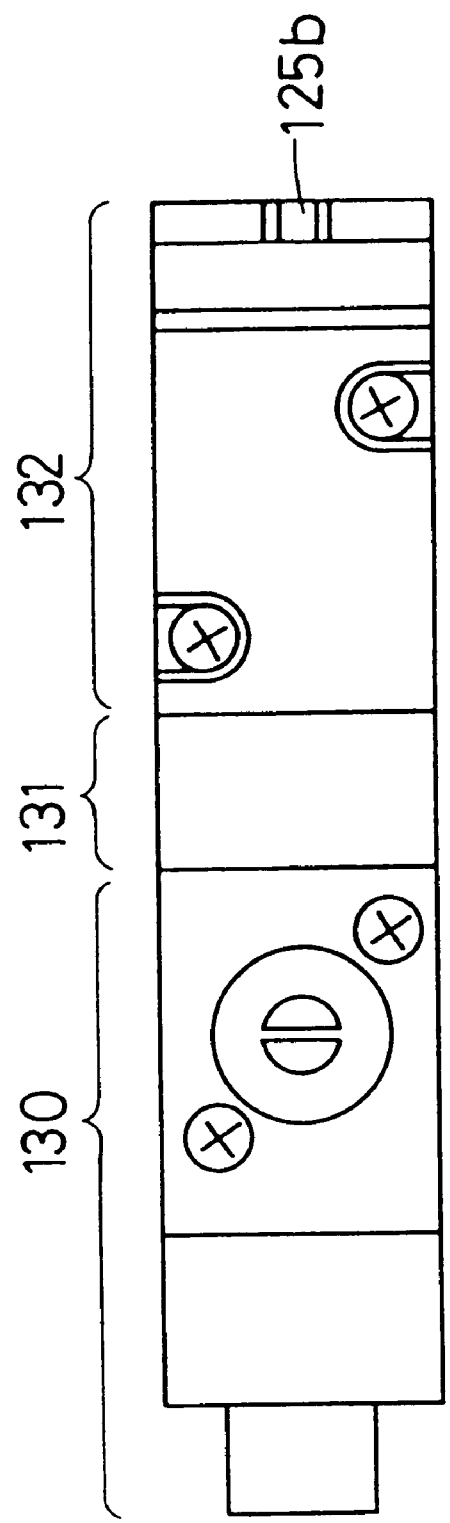
FIG. 19 is a top view of an NC type 3-port solenoid valve which is a part of the manifold according to a second embodiment.
Figure 20:
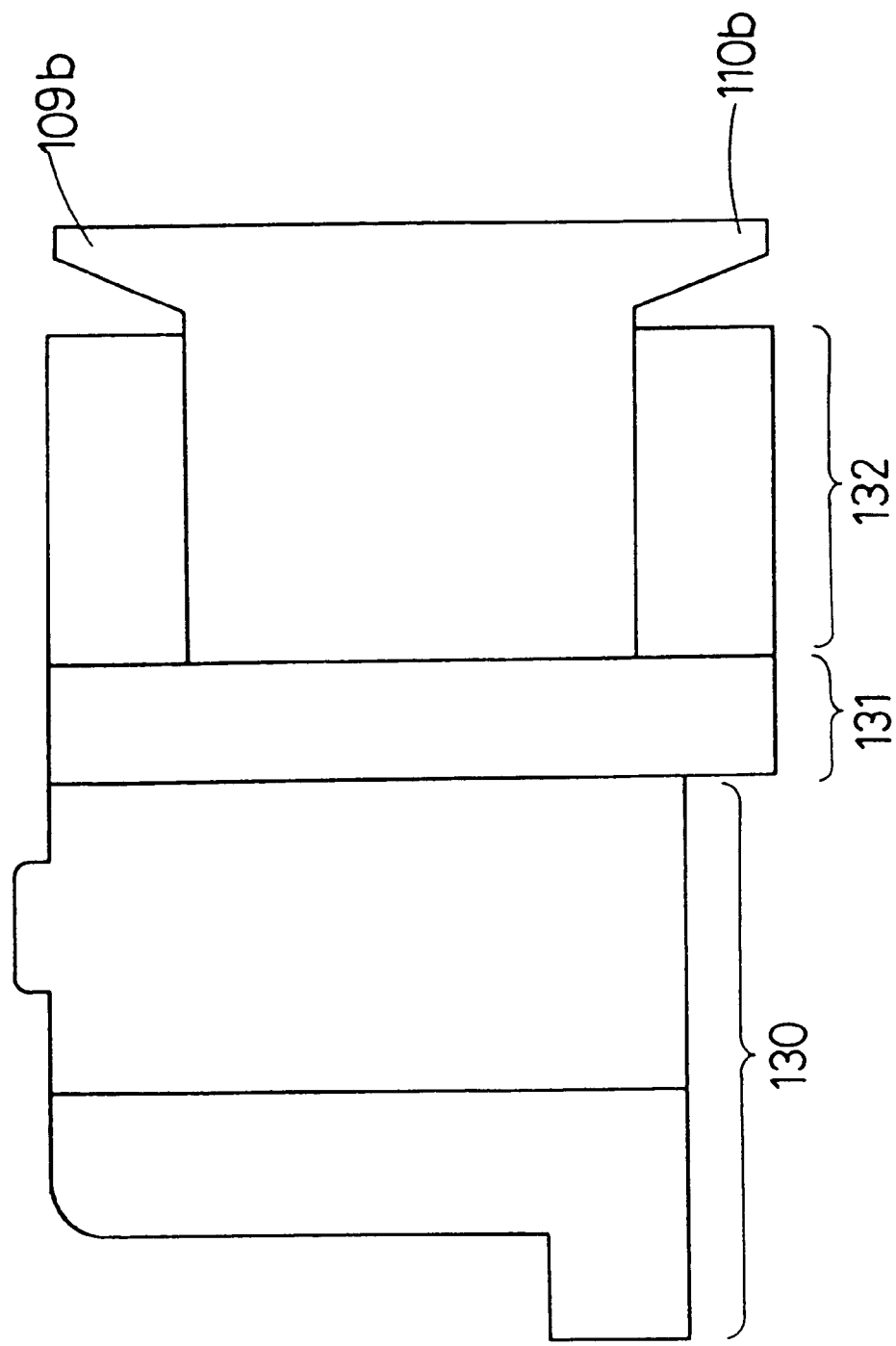
FIG. 20 is a side view of an NC type 3-port solenoid valve which a part of the manifold according to a second embodiment.

FIGS. 19 and 20 are respectively views with the portion of the NC type 3-port solenoid valve 105 of the manifold 1 extracted. FIG. 19 is a top view of the NC type 3-port solenoid valve 105, and FIG. 20 is a side view of the same. The NC type 3-port solenoid valve 105 comprises a pilot type solenoid valve 130, a pneumatic switching valve body 132, and a plate-like connecting plate 131 for connecting them, as shown in FIG. 19, seal gaskets being mounted on the respective connection surfaces to prevent air from leaking.

As shown in FIG. 20, connecting convex portions 109b and 110b are formed in the connection portions with the manifold base 102.

Figure 21:
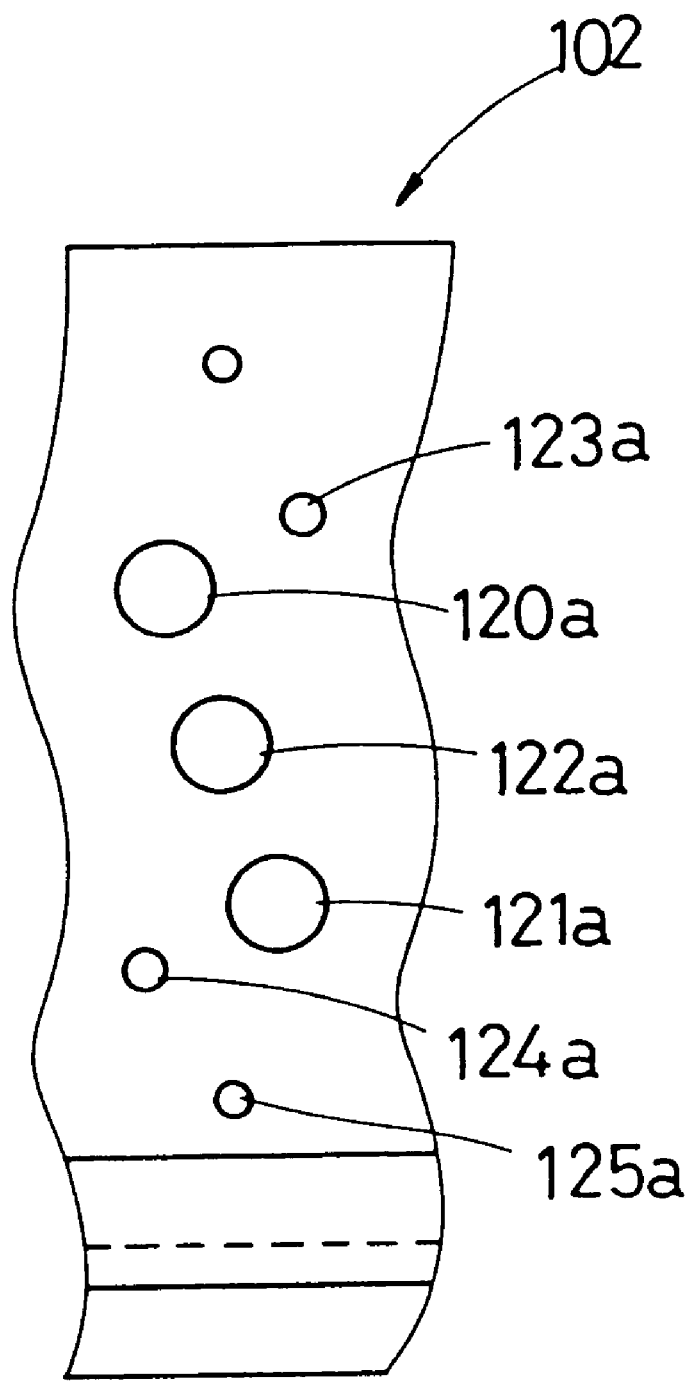
FIG. 21 is a front view of a connection surface on the manifold base side of an NC type 3-port solenoid valve of the manifold according to a second embodiment.
Figure 22:
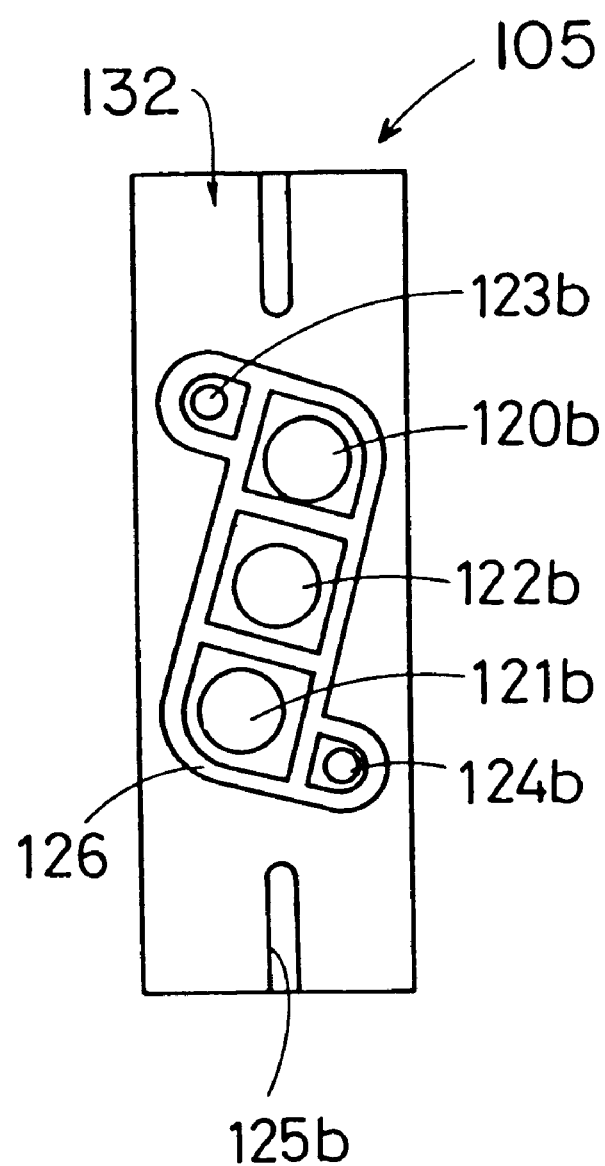
FIG. 22 is a front view of a connection surface on the NC type 3-port solenoid valve side of an NC type 3-port solenoid valve of the manifold according to a second embodiment.

FIGS. 21 and 22 show a connection surface between the manifold base 102 and the NC type 3-port solenoid valve 105. FIG. 21 is a front view of the connection surface on the manifold base 102 side, and FIG. 22 is a front view of the connection surface on the NC type 3-port solenoid valve 105 side. The connection surface on the manifold base 102 side is formed with air ports 120a, exhaust ports 121a, output ports 122a, pilot air ports 123a, pilot exhaust ports 124a, and connecting pins 125a, as shown in FIG. 21.

On the other hand, the connection surface on the NC type 3-port solenoid valve 105 side is also formed with air ports 120b, exhaust ports 121b, output ports 122b, a pilot air port 123b, a pilot exhaust port 124b, and a connecting pin receptacle 125b, as shown in FIG. 22. Seal gaskets 126 are provided to seal the ports.

A method for mounting the NC type 3-port solenoid valve 105 on the manifold base 102 will be described below.

In mounting the NC type 3-port solenoid valve 105 on the manifold base 102, first, the connecting convex 110b of the NC type 3-port solenoid valve 105 is placed in engagement with the connecting concave portion 110a of the manifold base 102. Next, the pin receptacle 125b of the NC type 3-port solenoid valve 105 is fitted in the connecting pin 125a of the manifold base 102. Then, the connecting convex portion 109b of the NC type 3-port solenoid valve 105 and the connecting concave portion 109a of the manifold base 102 are fixed by the connecting fitting 125 and the fixing screw 126 to complete connection. The ports formed in the connection surface of the manifold base 102 and the NC type 3-port solenoid valve 105 are airtightly held by the seal gasket 126.

The NO type 3-port solenoid valve 104 is also mounted on the manifold base 102 similarly to the aforementioned mounting method. In this way, a number of 3-port valves and 4-port valves are mounted on the manifold base 102 to form the manifold 101.

The construction of the NC type 3-port solenoid valve 105 which constitutes a part of the manifold 101 will be described. As previously mentioned, the NC type 3-port solenoid valve 105 comprises the pilot type solenoid valve 130, the pneumatic switching valve body 132, and the connecting plate 131. Their constructions will be explained.

Figure 23:
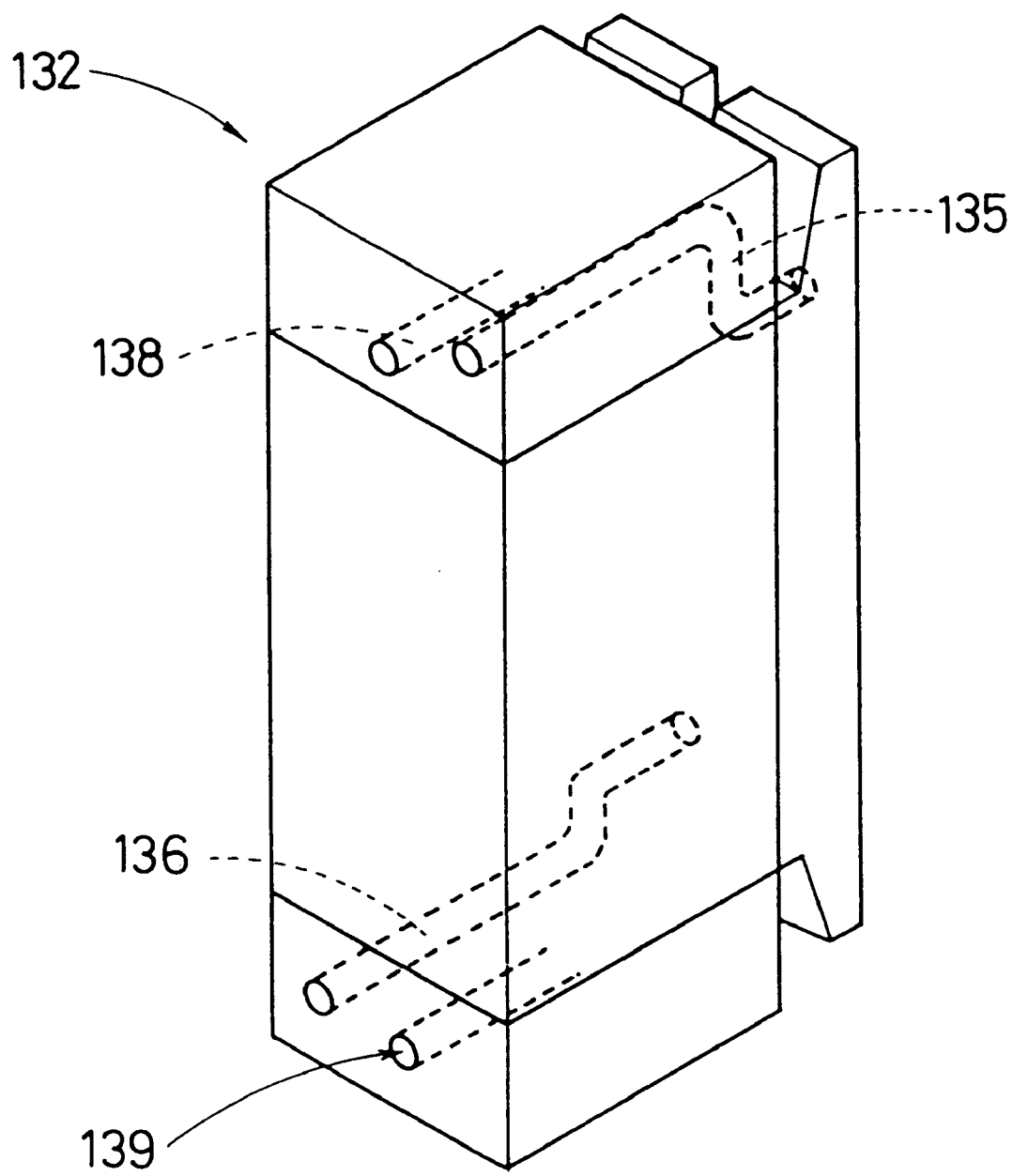
FIG. 23 is a perspective view of an air pressure switching valve body which is a constitutional part of an NC type 3-port solenoid valve according to the second embodiment.
Figure 24:
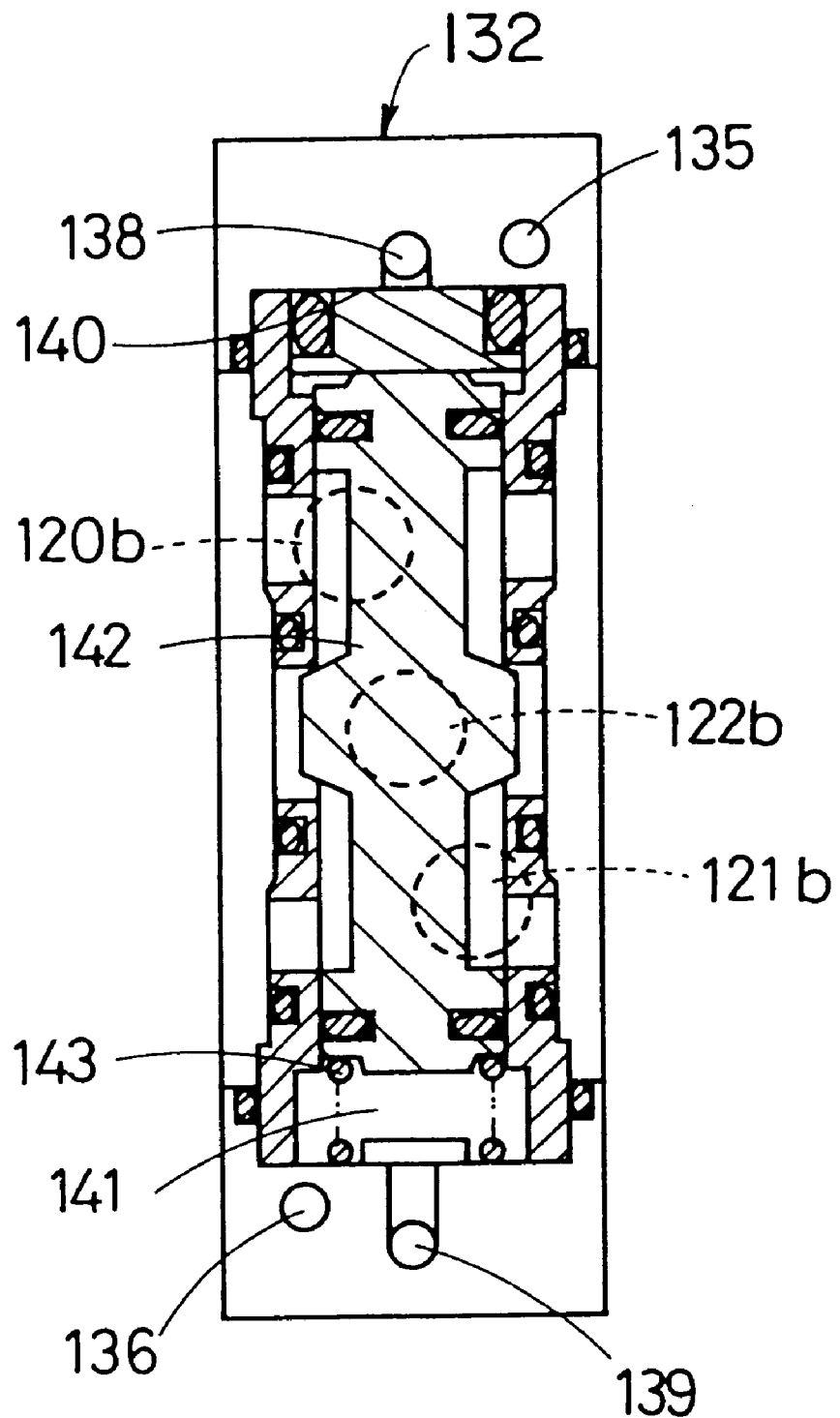
FIG. 24 is a sectional view of an air pressure switching valve body which is a constitutional part of an NC type 3-port solenoid valve according to the second embodiment, showing a state where a solenoid coil is not energized.
Figure 25:
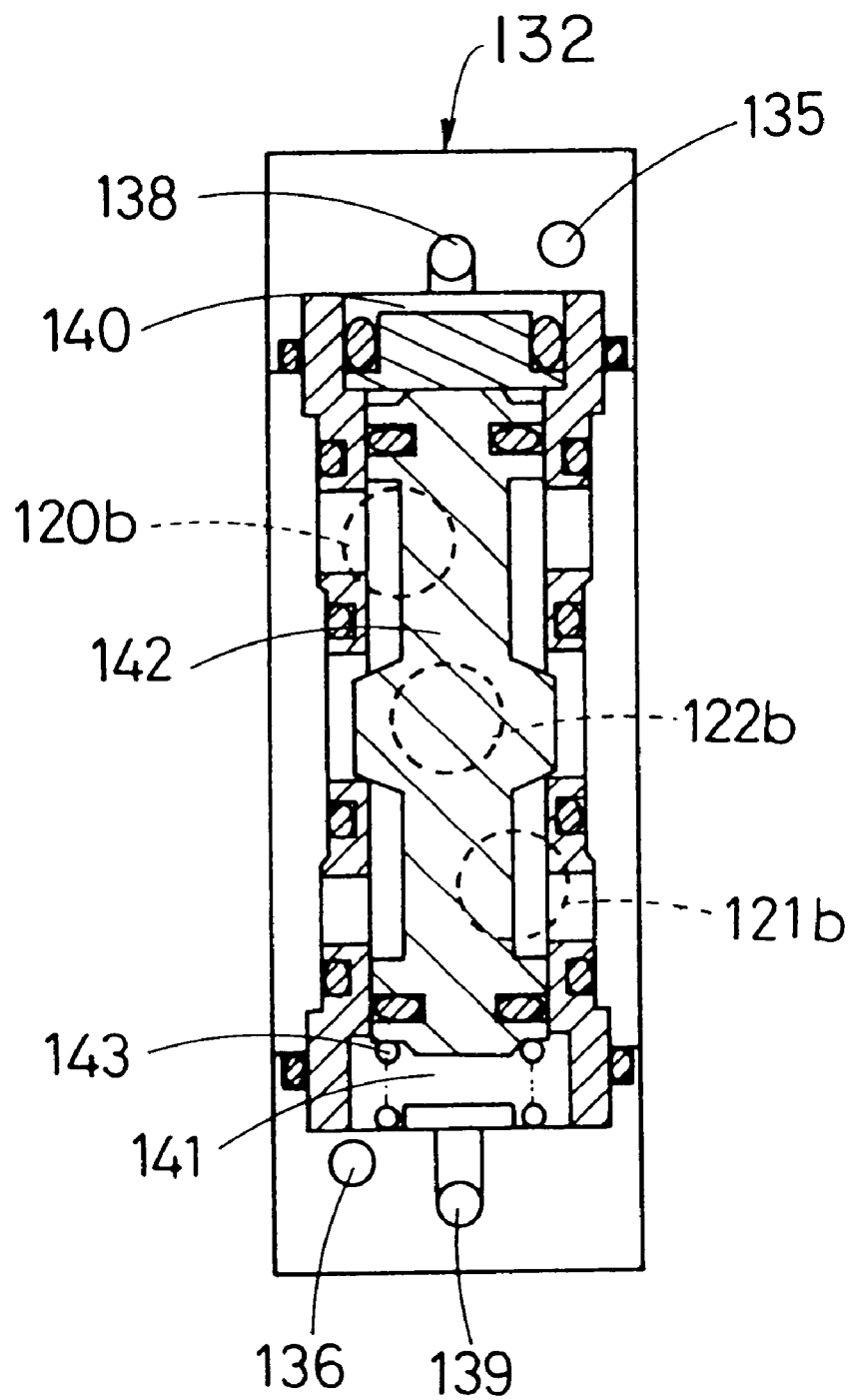
FIG. 25 is a sectional view of an air pressure switching valve which is a constitutional part of an NC type 3-port solenoid valve according to the second embodiment, showing a state where a solenoid coil is energized.

First, the construction of the pneumatic switching valve body 132 will be described with reference to FIGS. 23, 24 and 25. FIG. 23 is a perspective view of the pneumatic switching valve body 132, FIGS. 24 and 25 are sectional views of the same. FIG. 24 shows a state in which the solenoid valve is deenergized, and FIG. 25 shows a state in which the solenoid valve is energized.

As shown in FIG. 23, the pneumatic switching valve body 132 is formed with extending pilot air port 135 and pilot exhaust port 136 and pilot output ports 138 and 139 communicated with air chambers. As shown in FIG. 24, the pneumatic switching valve body 132 houses a poppet valve 142, which is biased upward by means of a spring 143. The pilot exhaust port 139 and the pilot output port 138 are communicated with an air chamber 141 and an air chamber 140, respectively.

Figure 26:
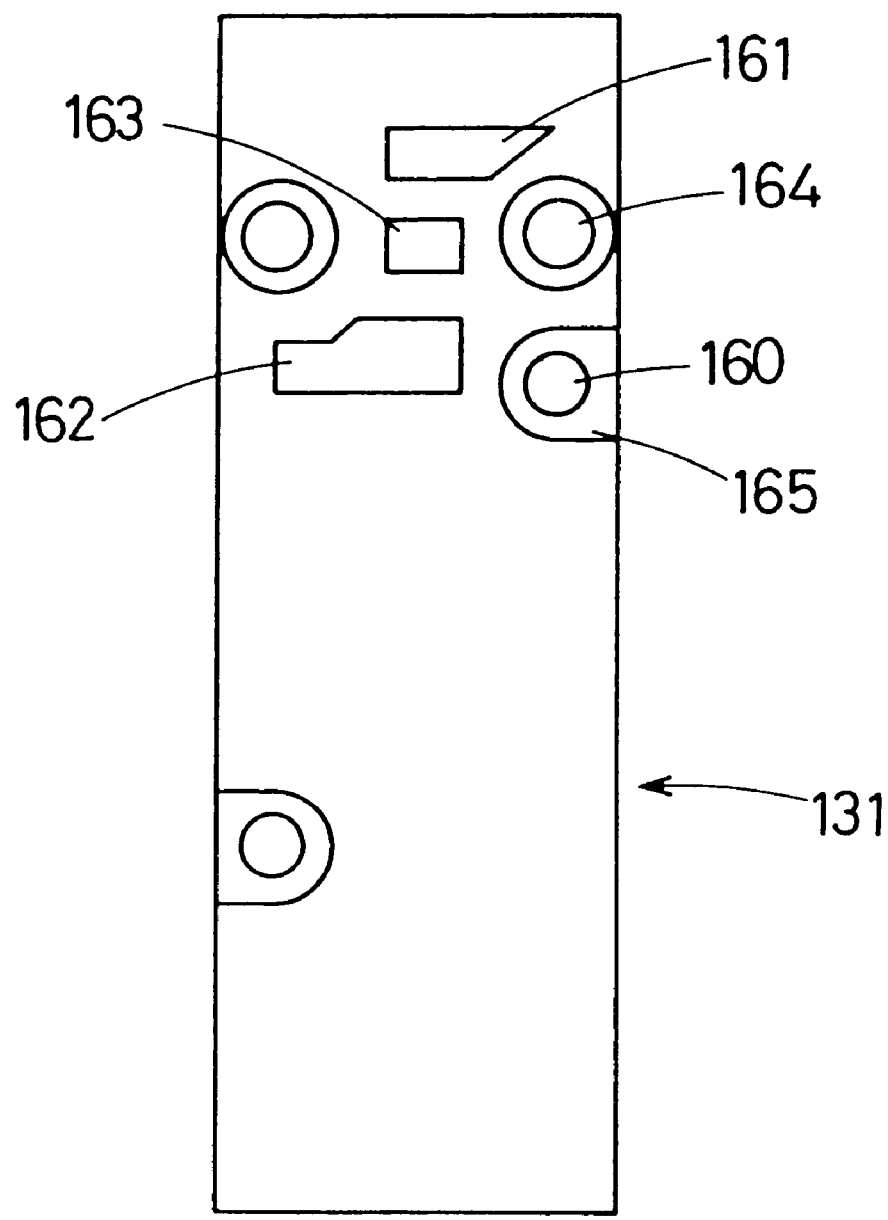
FIG. 26 is a front view of a connecting plate which is a constitutional part of a 3-port solenoid valve according to the second embodiment as viewed from the pilot type solenoid valve side.
Figure 27:
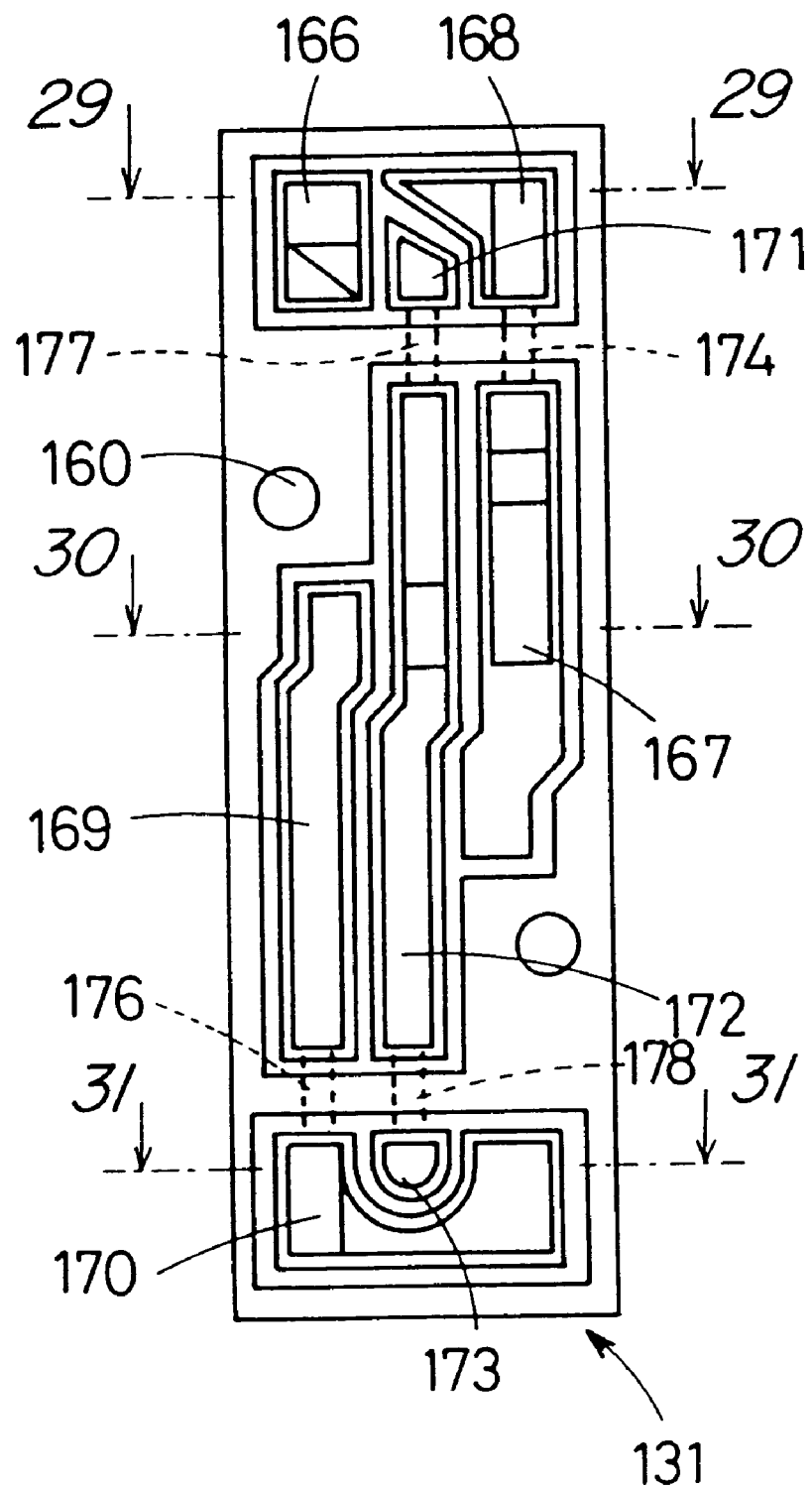
FIG. 27 is a front view of a connecting plate which is a constitutional part of a 3-port solenoid valve according to the second embodiment as viewed from the air pressure switching valve body side.
Figure 28:
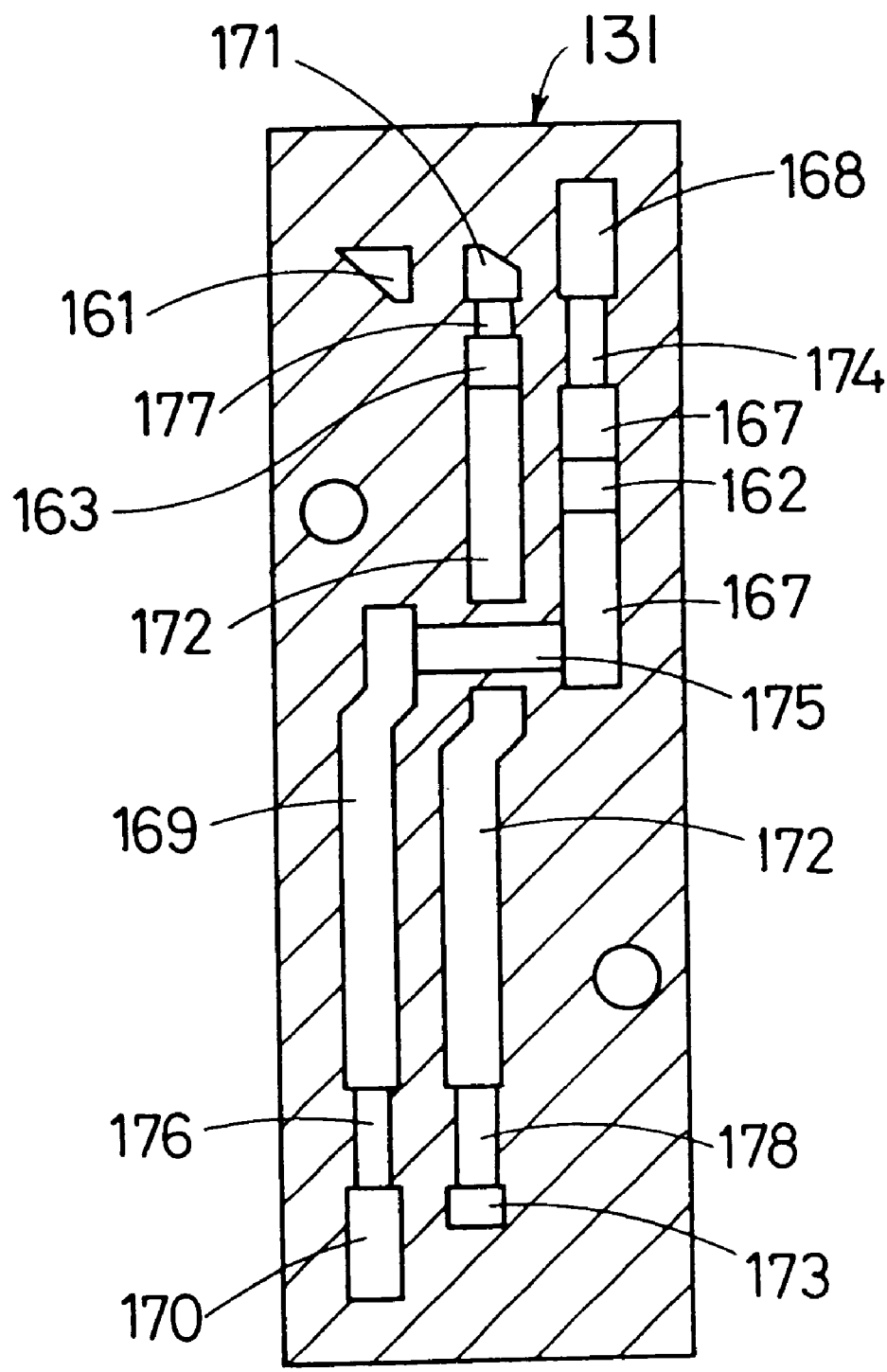
FIG. 28 is a sectional view shown in FIG. 26.
Figure 29:
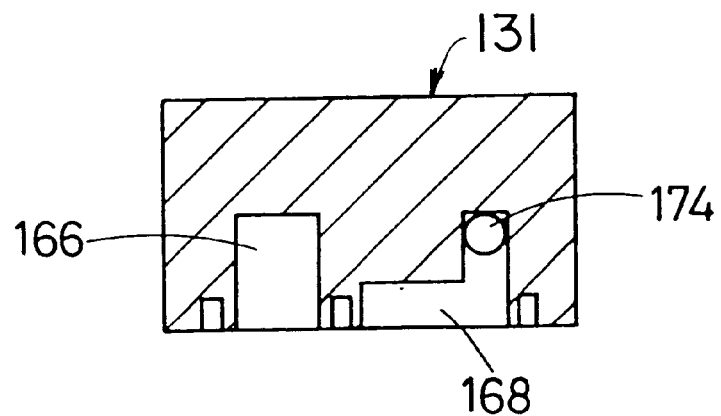
FIG. 29 is a sectional view taken on 29—29 of FIG. 27.
Figure 30:
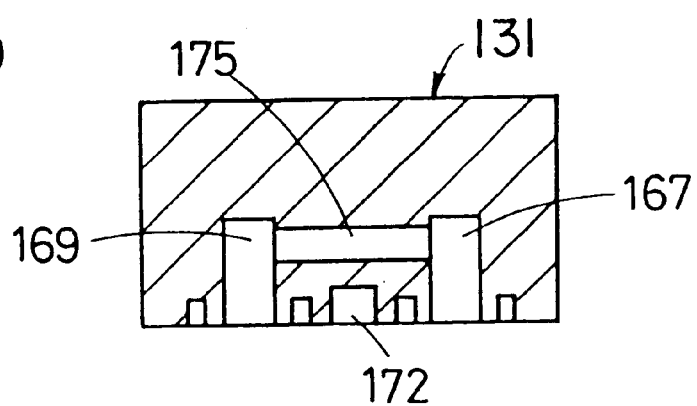
FIG. 30 is a sectional view taken on 30—30 of FIG. 27.
Figure 31:
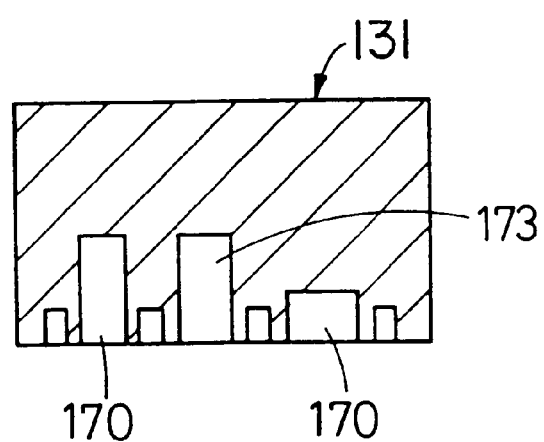
FIG. 31 is a sectional view taken on 31—31 of FIG. 27.
Figure 32:
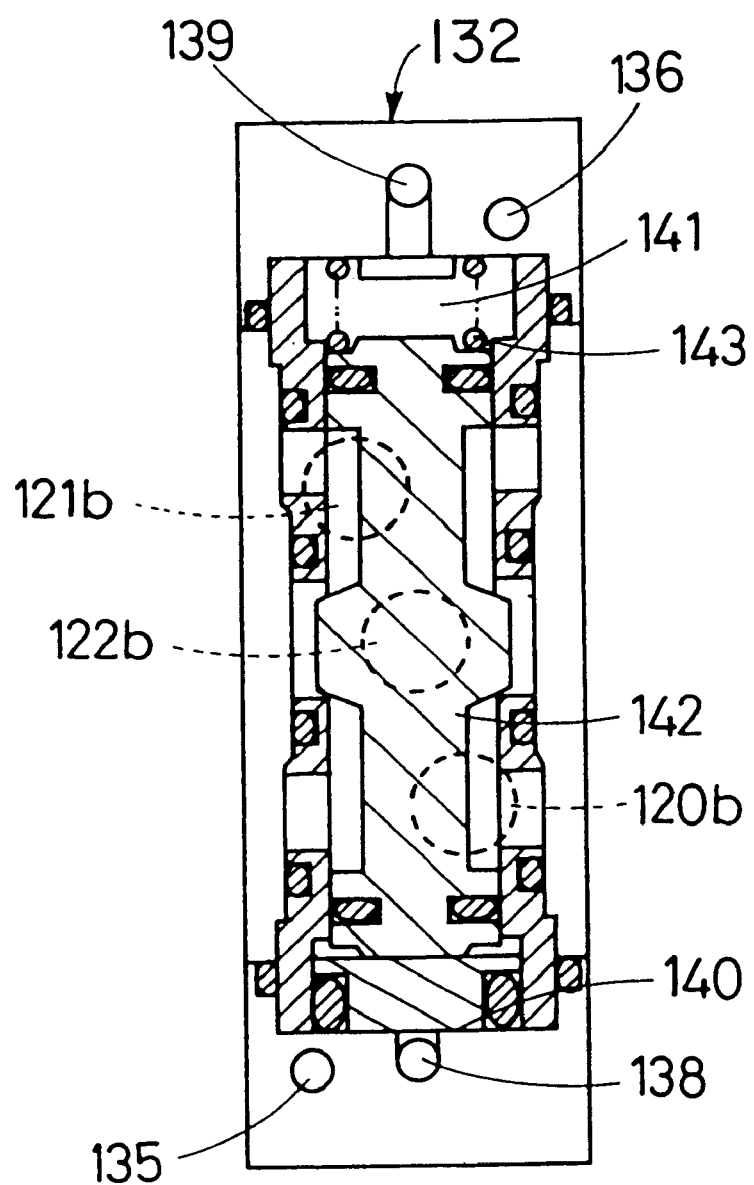
FIG. 32 is a sectional view of an air pressure switching valve body which is a constitutional part of an NO type 3-port solenoid valve according to the second embodiment, showing a state where a solenoid coil is not energized.

Next, the construction of the connecting plate 131 will be described with reference to FIGS. 26 to 31. FIG. 26 is a front view of the connecting plate 131 as viewed on the pilot type solenoid valve 130 side, and FIG. 27 is a front view of the same as viewed on the pneumatic switching valve 132 side. FIG. 28 is a sectional view of the same. FIG. 29 is a sectional view taken on 29—29 of FIG. 27, FIG. 30 is a sectional view taken on 30—30 of the same, and FIG. 31 is a sectional view taken on 31—31 of the same.

On the pilot type solenoid valve 130 side of the connecting plate 31 are formed two connecting tapped holes 160 with the pneumatic switching body 132, a pilot air port 161, a pilot exhaust port 162 and a pilot output port 163 which extend through the connecting plate 131, as shown in FIG. 26. Around the tapped hole 160 is formed a notch 165 by a head portion of the connecting screw to prevent the connecting screw from being protruded. Further, there are formed two connecting internal threads 164 with the pilot solenoid valve 130.

On the other hand, on the pneumatic switching valve body 132 side of the connecting plate 131 are formed a pilot air groove 166, pilot exhaust grooves 167, 168, 169, 170 and pilot output grooves 171, 172, 173, as shown in FIG. 27.

The grooves 166, 171, 168 provided at the upper part of the connecting plate 131 will be described. As shown in the figure, the pilot air groove 166 extends through the connecting plate 131 and is communicated with the pilot air port 161. The pilot exhaust groove 168 and the pilot output groove 171 have the same depth, the pilot exhaust groove 168 and the pilot output groove 171 being communicated with a connecting passage 174 and a connecting passage 177, respectively. The connecting passage 177 is communicated with the pilot output port 163.

Next, the grooves 169, 172 and 167 provided in the middle of the connecting plate 131 will be described. As shown in FIG. 27, the longitudinally extending left and right grooves 169 and 167 are arranged with the groove 172 located in the center. The pilot output groove 172 is shallow in depth so as to avoid the connecting passage 175, and which is communicated with the connecting passages 177 and 178, as shown in FIGS. 28 and 30. The pilot exhaust groove 167 is communicated with the pilot exhaust port 162 in the middle of the groove, the connecting passage 174 above the groove and the connecting passage 175 below the groove. The pilot exhaust groove 169 is communicated with the connecting passage 175 above the groove and the connecting passage 176 below the groove. The pilot exhaust grooves 169 and 167 are communicated with the connecting passage 175.

The grooves 170 and 173 provided at the lower part of the connecting plate 131 will be described. As shown in FIG. 31, the pilot exhaust groove 170 is constructed to have two-stage depth. The deepest depth of the pilot exhaust groove 170 is the same as the depth of the pilot output groove 173. As shown in FIG. 28, the pilot exhaust groove 170 and the pilot output groove 173 are communicated with the connecting passages 176 and the connecting passage 178, respectively.

As described above, the connecting plate 131 is formed with three flowpassages. That is, for air of pilot air, the pilot air port 161 and the pilot air groove 166 are communicated; for exhaust, the pilot exhaust port 162 and the pilot exhaust grooves 168, 170 are communicated; and for output, the pilot output port 163 and the pilot output grooves 171, 173 are communicated.

Figure 17:
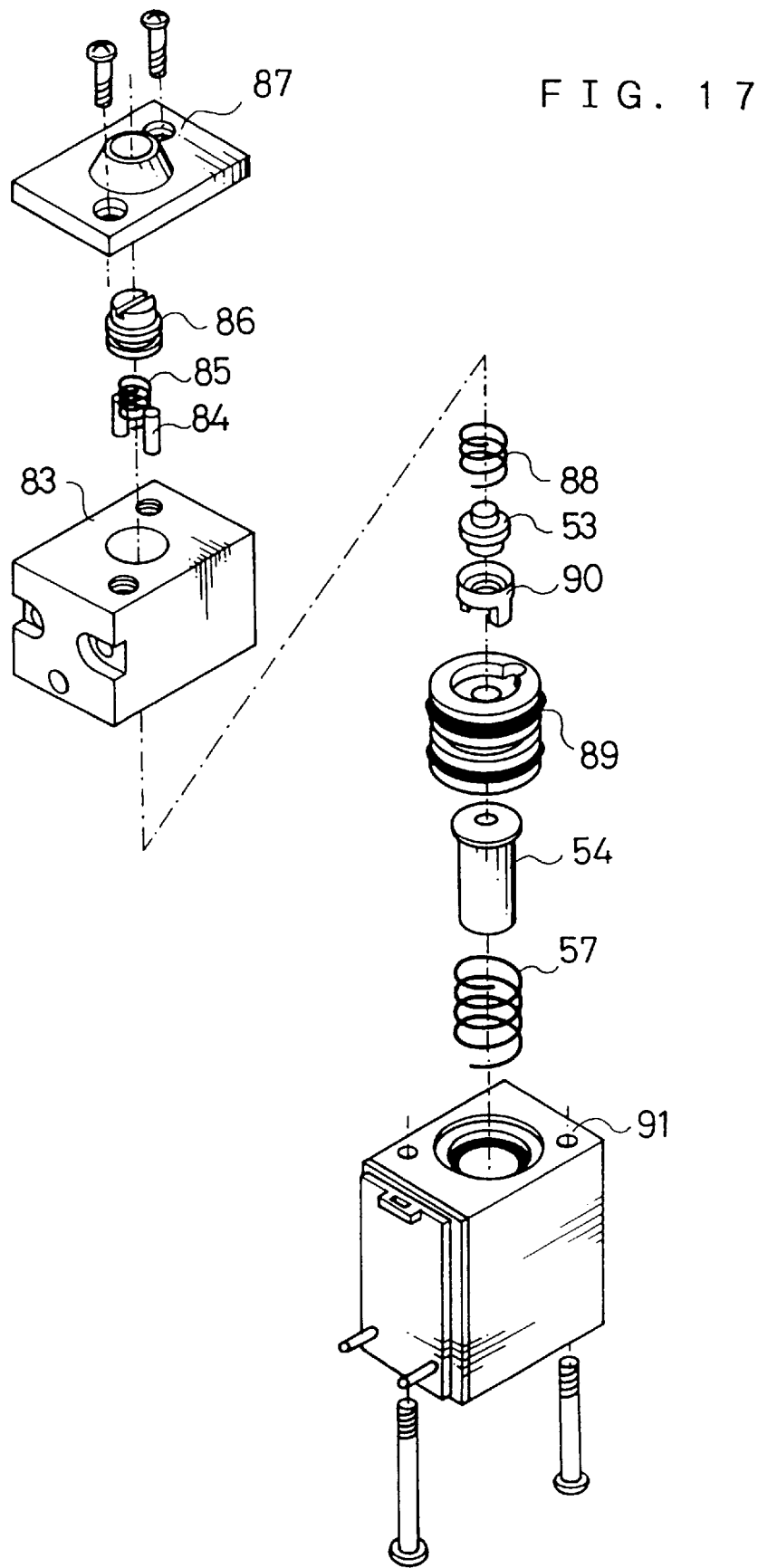
FIG. 17 is an exploded perspective view of a movable portion of a pilot type solenoid valve which is a constitutional part of a 4-port solenoid valve according to the present invention.

The construction of the pilot type solenoid valve 130 is exactly the same as that of the first embodiment as shown in FIGS. 15, 16 and 17, description of which is therefore omitted.

The flowpassage of operating air in the NC type 3-port solenoid valve 105 constructed by parts described above will be described. First, a description is made in a state where the coil 55 is deenergized. With respect to a main flowpassage, as shown in FIG. 24, the output port 122b and the exhaust port 121b of the pneumatic switching valve body 132 are communicated.

Air supplied to the pilot air port 113 of the manifold base 102 passes through the pilot air port 135 of the pneumatic switching valve body 132, the pilot air groove 166 of the connecting plate 131, and the pilot air port 161, and thence flow into the pilot air port 50 of the pilot type solenoid valve 130. At this time, as shown in FIG. 15, since the pilot air port 50 is closed by the valve 53, the pilot air stays thereat.

Next, a description is made in a state where the coil 55 is energized. As previously mentioned, when the coil 55 is energized, the plunger 54 is moved downward by attraction of the coil 55, whereby the valve 53 also moves downward. By the downward movement of the valve 53, the pilot air port 50 and the pilot output port 52 are communicated. Then, the pilot air flows from the pilot output port 52 to the pilot output port 163 of the connecting plate 131. Within the connecting plat 131, the air flows from the pilot output port 163 to the pilot output groove 171 through the connecting passage 177, as shown in FIG. 28. Thence, the air passes through the pilot output grooves 138 of the pneumatic switching valve body 132. Since the pilot output port 138 is communicated with the air chamber 140, pilot air is supplied to the air chamber 140. As a result, air pressure overcomes the spring 143 to move the poppet valve 142. Thereby, as shown in FIG. 25, the air port 120b and the output port 122b are communicated so that the main flowpassage is switched.

On the other hand, air within the air chamber 141 passes through the pilot exhaust port 136 of the pneumatic switching valve body 132 through the pilot exhaust groove 170 of the connecting plate 131 from the pilot output port 139, and is discharged out of the pilot exhaust flowpassage 114 of the manifold 102.

When the coil 55 is deenergized, a supply of pilot air is stopped at the pilot air port 50 by the valve 53 within the pilot type solenoid valve 130. Thereby, no supply of pilot air to the air chamber 140 in the pneumatic switching valve body 132 exists, and the poppet valve 142 is returned to its original position by the spring 143. The main flowpassage is again switched so that the output port 122b and the exhaust port 121b are communicated.

On the other hand, pilot air remained in the air chamber 140 is exhausted outside through the following channel. First, the pilot air passes through the pilot output port 138 and flows into the pilot output groove 171 of the connecting plate 131. Then, the air flows into the pilot type solenoid valve 130 from the pilot output port 163 by the flowpassage formed within the connecting plate 131. Within the pilot type solenoid valve 130, the air flows from the pilot output port 152 to the pilot exhaust port 151, and again returns to the connecting plate 131.

After this, the air flows into the exhaust port 136 of the pneumatic switching valve body 132 by the flowpassage formed within the connecting plate 131, and is discharged outside passing through the pilot exhaust port 114 of the manifold base 102.

The method for changing the flowpassage from NC type to NO type will be described. First, the NC type 3-port solenoid valve 105 is removed from the manifold base 102. Next, the NO type 3-port solenoid valve 104 is disassembled into the pilot solenoid valve 130, the connecting plate 131, and the pneumatic switching valve body 132. Then, only the pneumatic switching valve body 132 is rotated by 180 degrees so as to be reversed vertically and is again combined. After this, it is mounted on the manifold base 102. The changing of the flowpassage from NC type to NO type is completed.

The NO type 3-port solenoid valve 104 thus changed in flow passage will be described. The difference of the NO type 3-port solenoid valve 104 from the NC type 3-port solenoid valve 105 is that the arrangement of the pneumatic switching valve body 132 is inverted by 180 degrees vertically.

Further, since the air and exhaust ports formed in the connecting surfaces of the pneumatic switching valve 132 and the manifold 102 are arranged point-symmetrically about the output ports as shown in FIGS. 21 and 22, the air and exhaust ports of the pneumatic switching valve 132 and the manifold base 102 are communicated as follows. The air port 120a and the pilot air port 123a of the manifold base 102 are communicated with the exhaust port 121b and the pilot exhaust port 124b of the pneumatic switching valve 132 are communicated with the exhaust port 121a and the pilot exhaust port 124a of the manifold base 102, and the air port 120b and the pilot air port 123b of the pneumatic switching valve 132 are communicated. That is, the air port in the NC type is used as the exhaust port in the NO type, and the exhaust port in the NC type is used as the air port in the NO type.

The function of the NO type 3-port solenoid valve and the flow of pilot air will be described. Air supplied to the pilot air port 113 of the manifold base 102 passes through the pilot exhaust port 136 of the pneumatic switching valve body 132, the pilot air groove 166 and the pilot air port 161 of the connecting plate 131, and flows into the pilot air port 50 of the pilot type solenoid valve 130. At this time, since the pilot air port 50 is closed by the valve 53, as shown in FIG. 15, the pilot air stays thereat.

Figure 33:
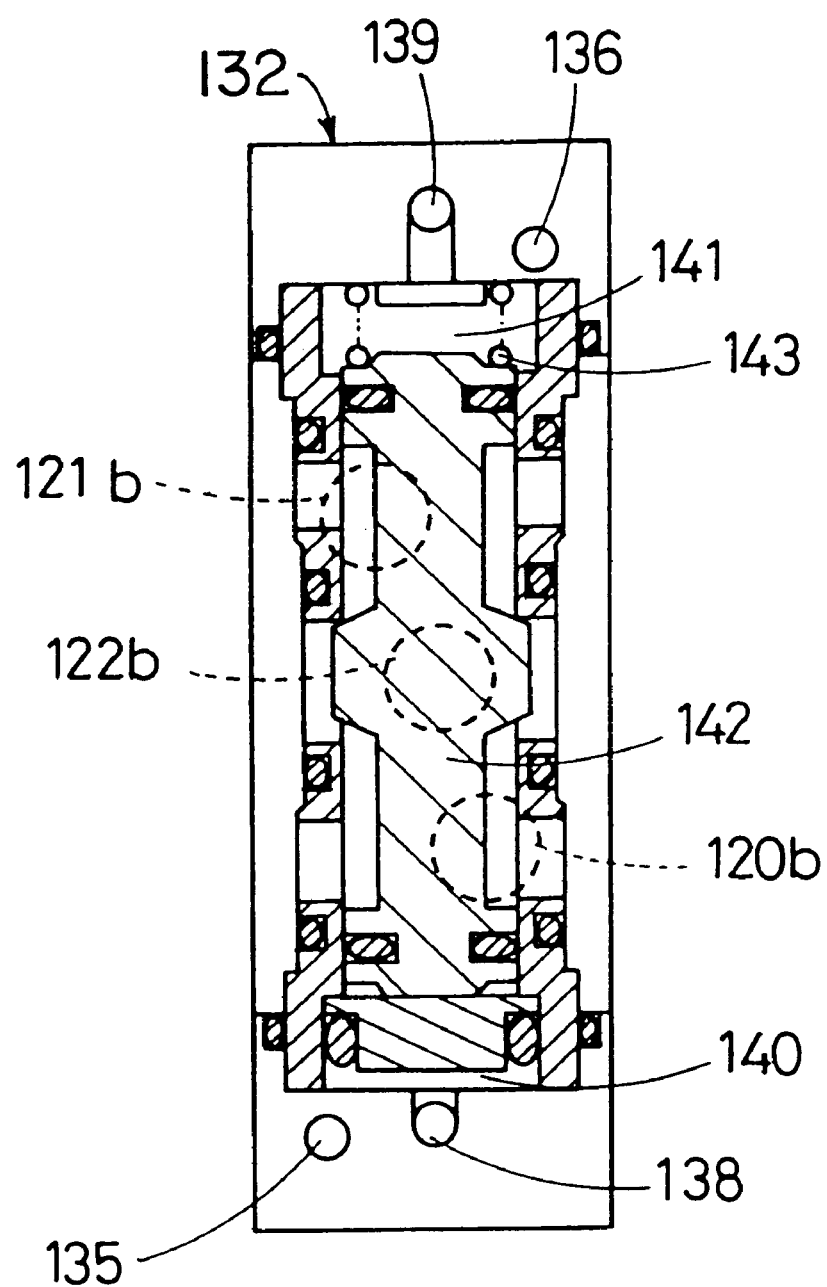
FIG. 33 is a sectional view of an air pressure switching valve which is a constitutional part of an NC type 3-port solenoid valve according to the second embodiment, showing a state where a solenoid coil is energized.
Figure 34:
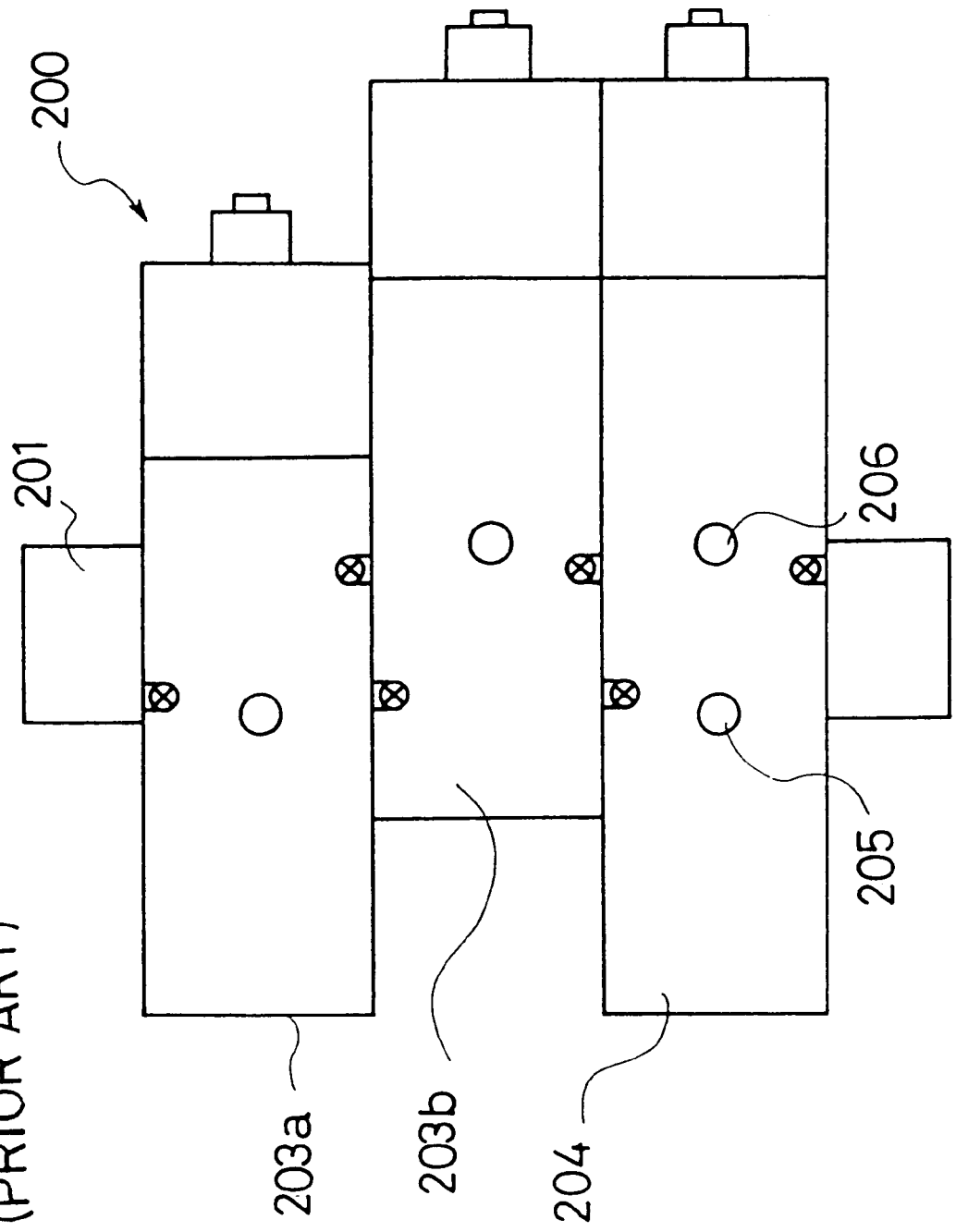
FIG. 34 is a top view of a manifold according to a first conventional embodiment.
Figure 35:
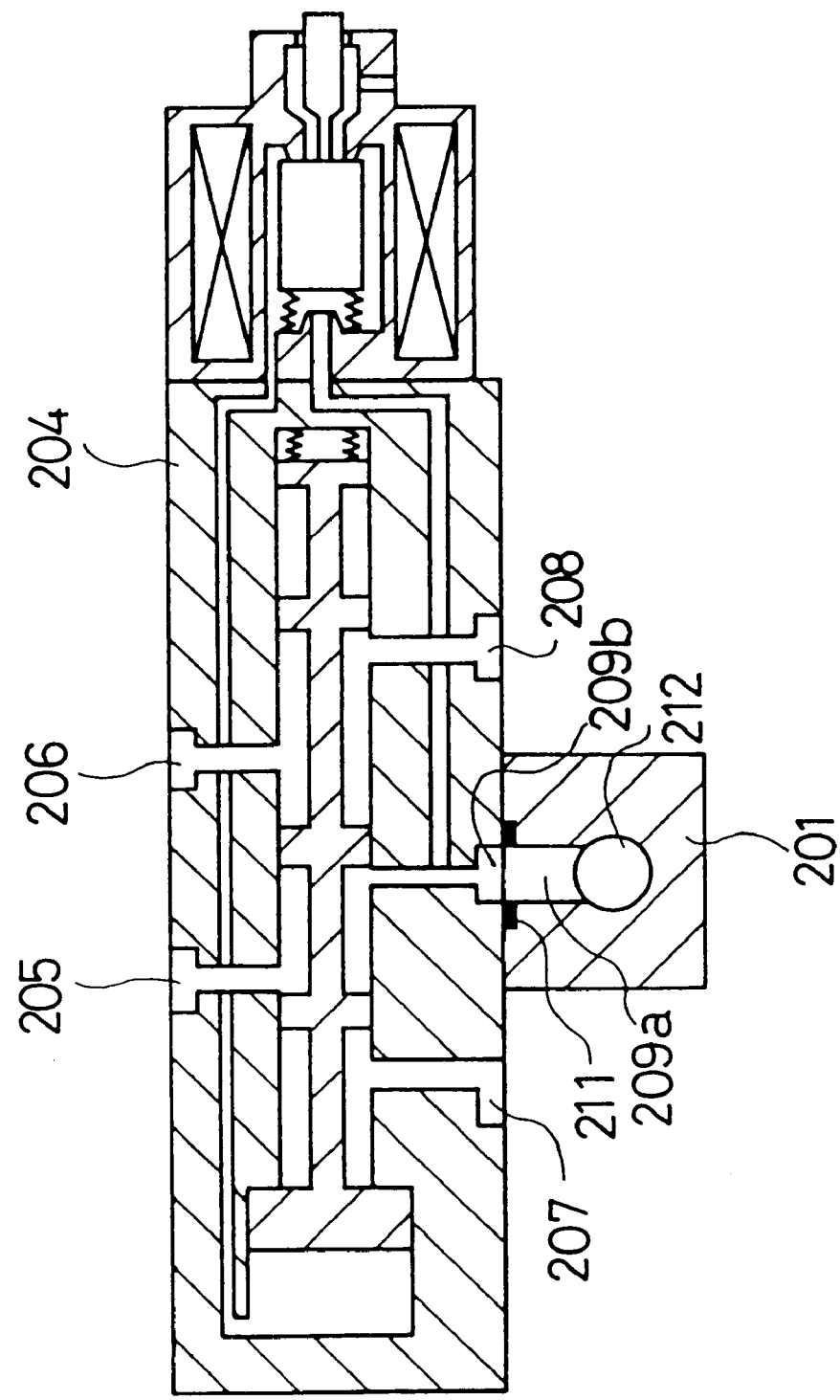
FIG. 35 is a sectional view of a 5-port valve portion of a manifold according to a first conventional embodiment.
Figure 36:
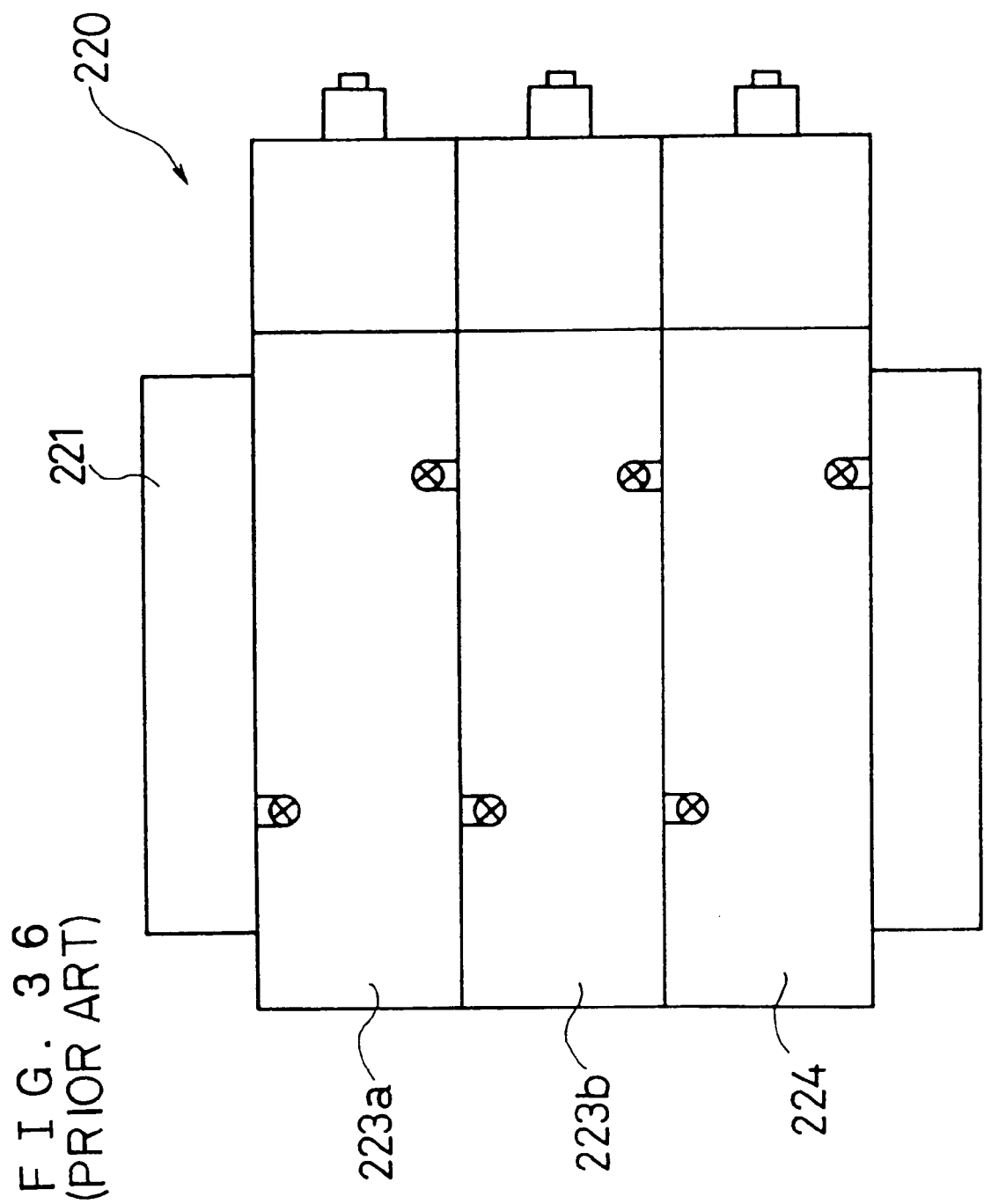
FIG. 36 is a top view of a manifold according to a second conventional embodiment.
Figure 37:
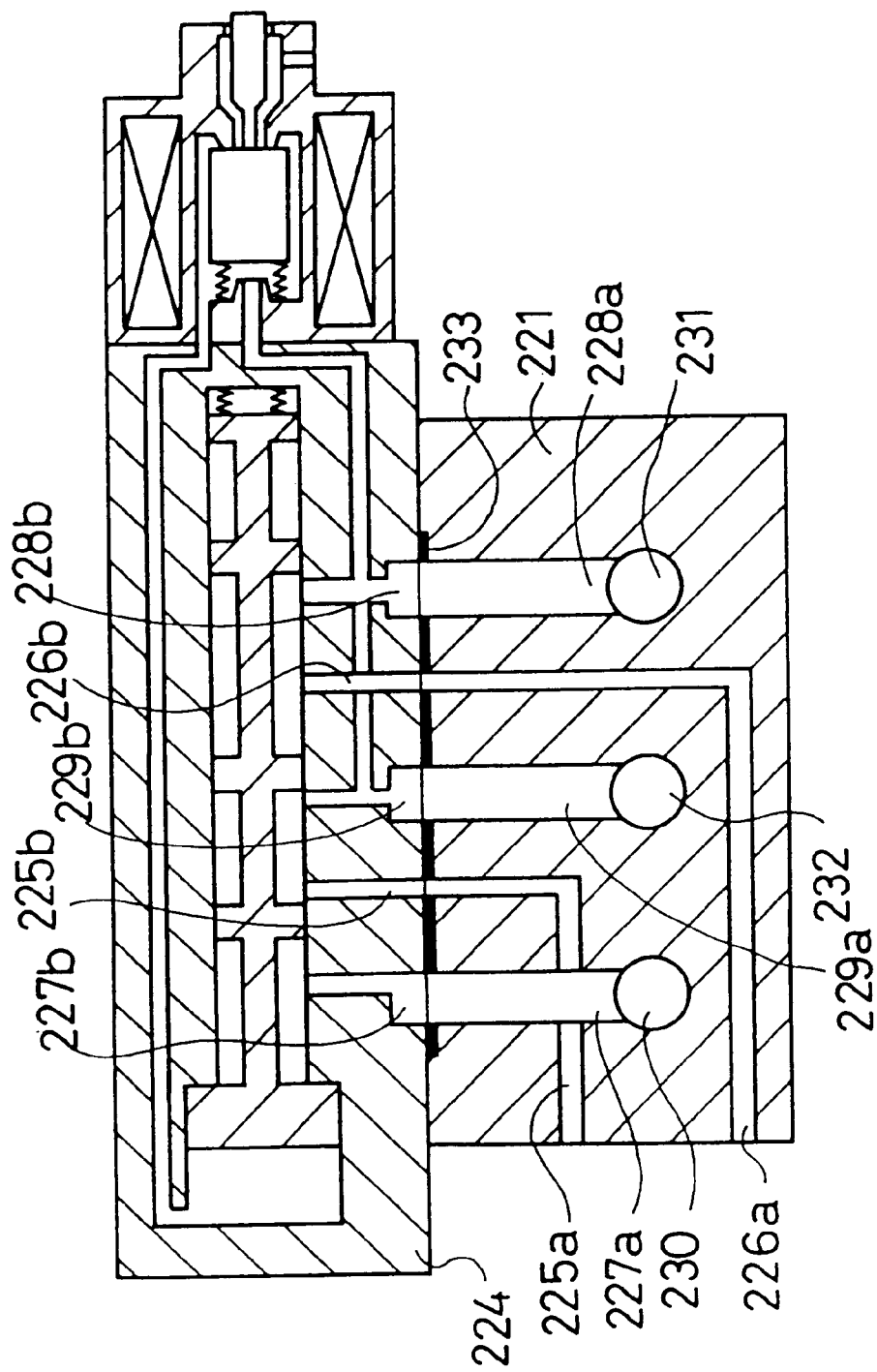
FIG. 37 is a sectional view of a 5-port valve portion of a manifold according to a second conventional embodiment.
Figure 38:
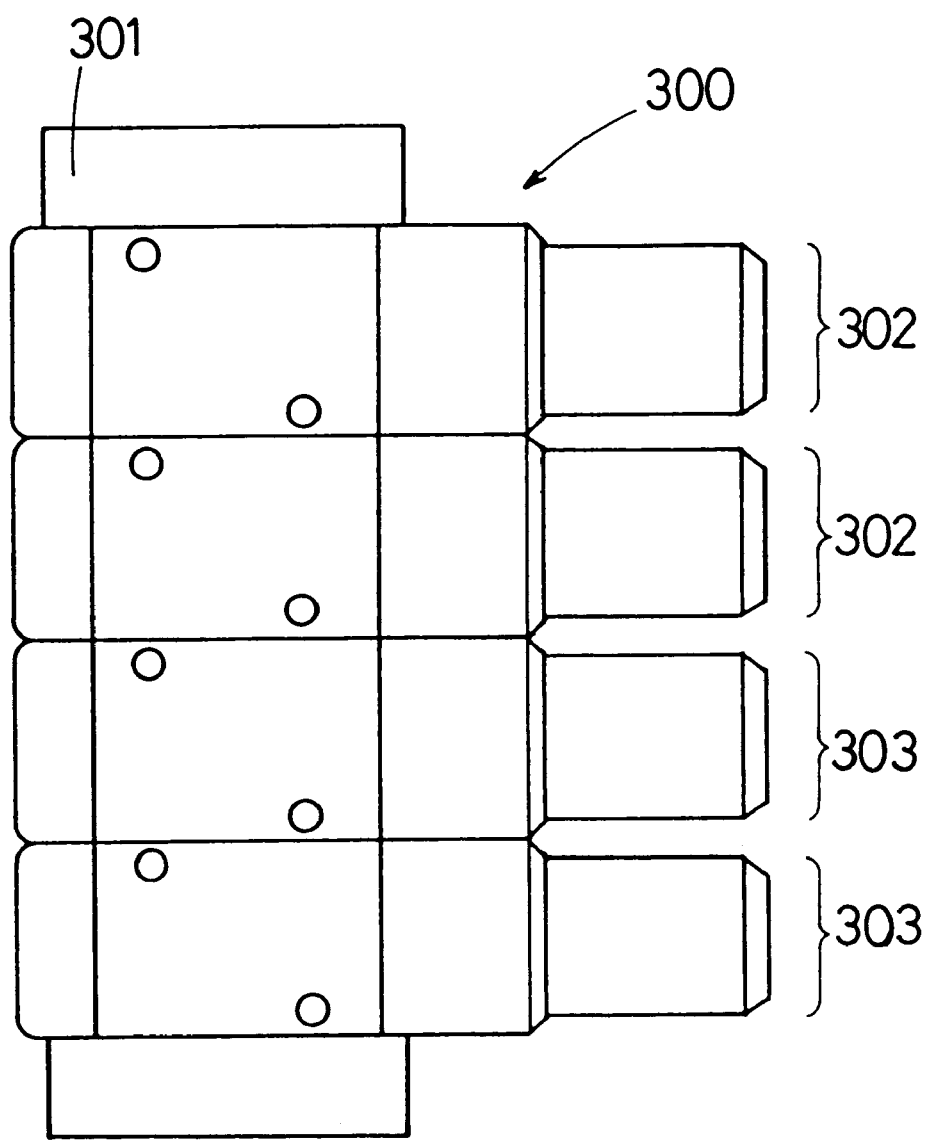
FIG. 38 is a top view of a manifold according to a third conventional embodiment.
Figure 39:
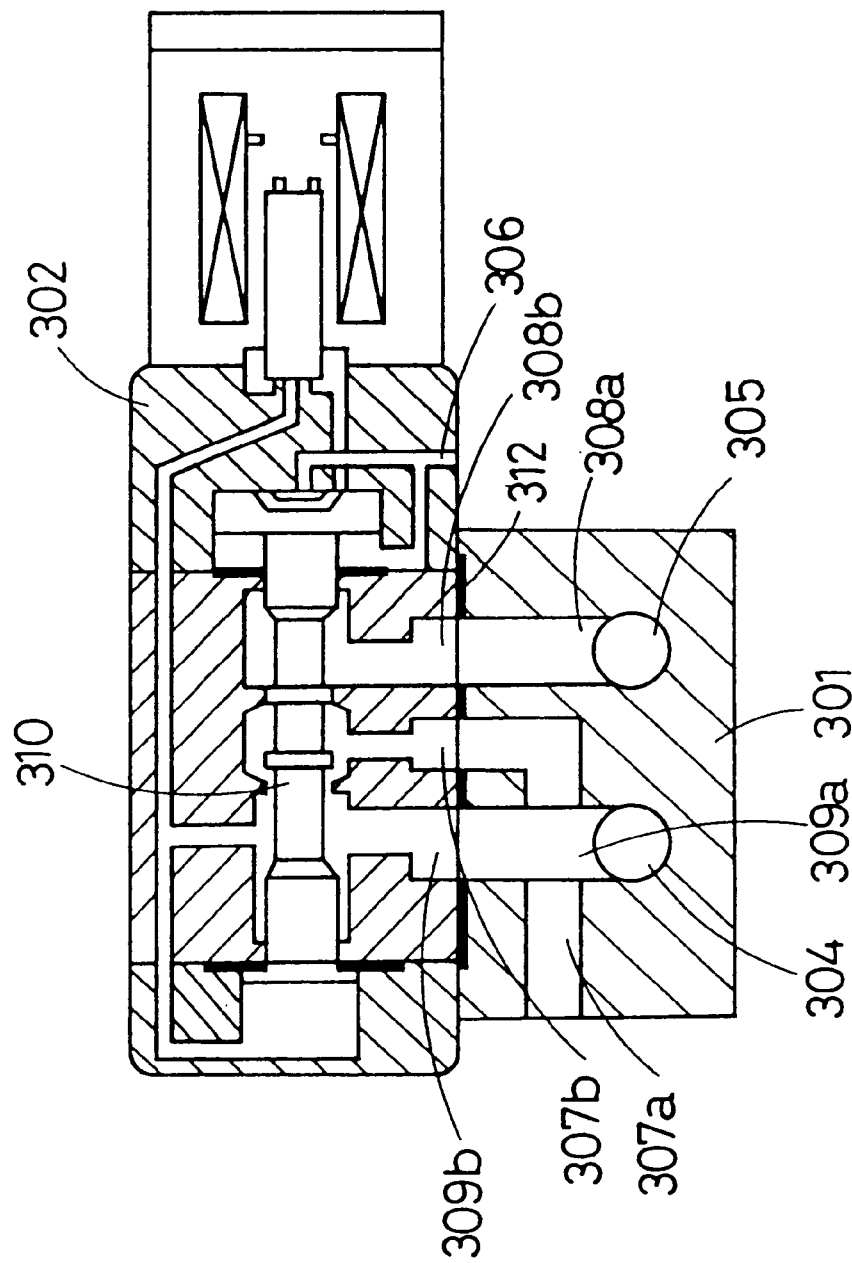
FIG. 39 is a sectional view of an NO type 3-port valve portion of a manifold according to a third conventional embodiment.
Figure 40:
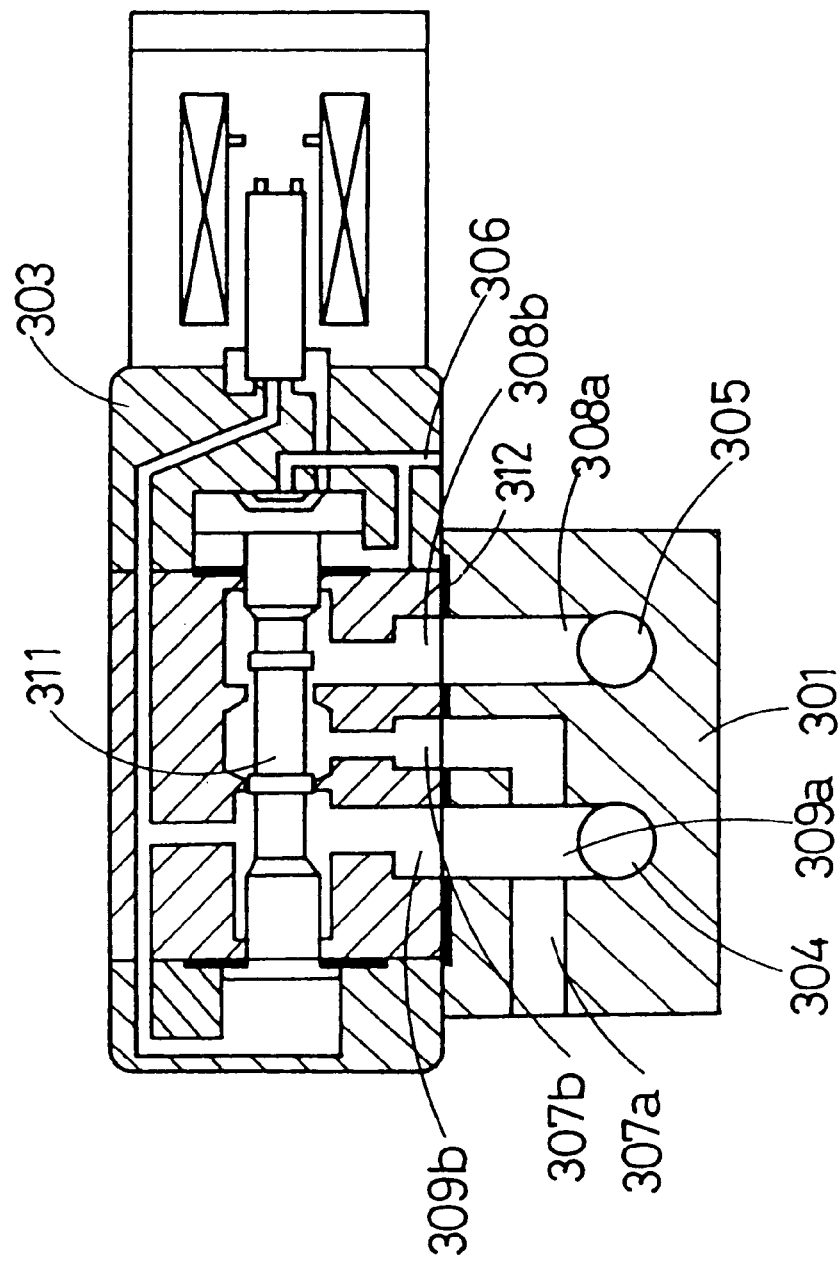
FIG. 40 is a sectional view of an NC type 3-port valve portion of a manifold according to a third conventional embodiment.
Figure 41:
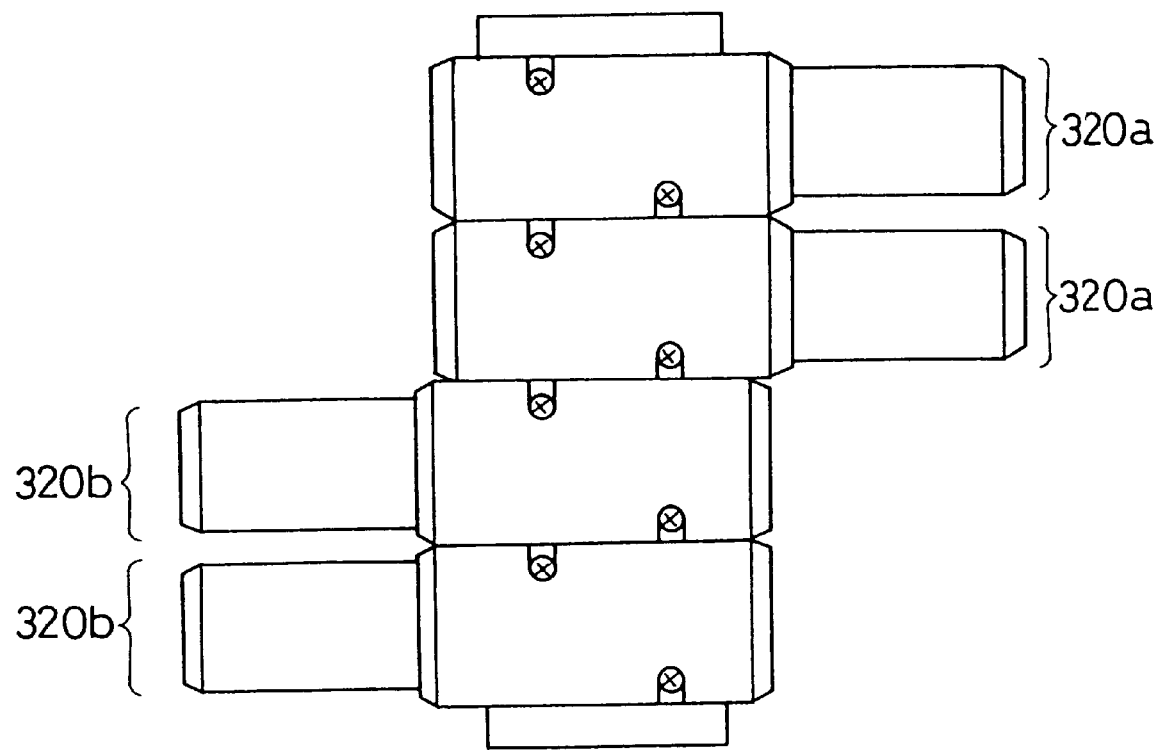
FIG. 41 is a top view of a manifold according to a fourth conventional embodiment.

Next, when the coil 55 is energized, the valve 53 in the pilot type solenoid valve 130 moves downward so that the pilot air port 50 and the pilot output port 52 are communicated. Then, the pilot air flows into the pilot output port 163 of the connecting plate 131 from the pilot output port 52. Within the connecting plate 131, the air flows into the connecting passage 177 from the pilot output port 163, and flows into the pilot output groove 173 through the pilot output groove 172, and thence flows into the pilot output port 138 of the pneumatic switching valve body 132. As a result, the poppet valve 142 moves, and the main flowpassage is switched as shown in FIG. 33.

On the other hand, air within the air chamber 141 flows into the pilot exhaust groove 168 of the connecting plate 131 from the pilot output port 139. The air then flows into the pilot exhaust groove 170 through the flowpassage formed in the connecting plate 131, passes through the pilot air port 135 of the pneumatic switching valve 132, and is discharged out of the pilot exhaust flowpassage 114 of the manifold base 102.

When the coil 55 is deenergized, a supply of pilot air is stopped at the pilot air port 50 by the valve 53 within the pilot type solenoid valve 130. Thereby, no supply of pilot air to the air chamber 140 in the pneumatic switching valve body 132 exists, and the poppet valve 142 is returned to its original position by the force of the spring 143. The main flowpassage is again switched.

On the other hand, pilot air remained in the air chamber 140 is exhausted outside through the following channel. First, the pilot air passes through the pilot output port 138, and flows into the pilot output groove 173 of the connecting plate 131. Then, the air flows into the pilot type solenoid valve 130 from the pilot output port 163 by the flowpassage formed within the connecting plate 131. Within the pilot type solenoid valve 130, the air flows from the pilot output port 52 to the pilot exhaust port 51, and again returns to the connecting plate 131. After this, the air flows into the pilot air port 135 of the pneumatic switching valve body 132 by the flowpassage formed within the connecting plate 131, and is discharged outside passing through the pilot exhaust port 114 of the manifold base 102.

That is, the air and exhaust ports formed in the connecting surfaces of the pneumatic switching valve 132 and the manifold base 102 are arranged point-symmetrically about the output ports, and the changing of the flowpassage between NO type to NC type can be made easily by the connecting plate 131.

As explained above, according to the manifold in the second embodiment, since the NO type and NC type 3-ports are constituted by the same parts, parts can be used in common in the production step to reduce the cost.

Furthermore, the air and exhaust ports formed in the connecting surfaces of the pneumatic switching valve 132 and the manifold base 102 are arranged point-symmetrically about the output ports. Thereby, when the pneumatic switching valve is rotated by 180 degrees, the changing of the flowpassage between NO type and NC type can be made by the same 3-port valve. Thus, a user need not possess two types of 3-port valves to reduce an economical burden.

Further, since the pneumatic switching valve body is separated from the pilot type solenoid valve, the maintenance and management are facilitated.

Further, since the connecting plate is independent of the flowpassage in which the air flowpassage for the pilot air control valve and the exhaust flowpassage are switched by the poppet valve or the spool valve, the concentrated process becomes enabled with even respect to the pilot air.

While the embodiments of the present invention have been described, it is to be noted that the present invention is not limited thereto but various applications can be employed.

That is, while in the present embodiment, for example, the pneumatic switching valve comprises the poppet valve, it is to be noted of course that the present invention can be applied to the spool valve.

Further, the present invention can be also applied to the case where the pilot air is not concentratedly processed.

Furthermore, while the solenoid valve has been used for controlling the pilot air, it is to be noted that a control valve by way of air can be employed.

While a supply port is explained as an air port in the above embodiment, it can be used as a vacuum port in the present invention.

The manifold according to the present invention has the effects as follows:

Since the 4-port valve is constituted by the 3-port valve, the 3-port valve and the 4-port valve can be provided on the manifold base constituted mainly by the 3-port valve. That is, the manifold provided with the 3-port valve and the 4-port valve can be miniaturized. Moreover, by the miniaturization, the responsiveness can be improved. Further, since the output port and the electric wiring are arranged linearly, pipe saving and wiring saving can be achieved, and the arrangement and maintenance properties are improved to facilitate the management.

Further, according to the manifold of the present invention, when the NO type 3-port valve and the NC type 3-port valve are mounted on the manifold base in the same direction, the distance from the manifold base to the outside of the NO type 3-port valve and the NC type 3-port valve is constant, and the NO type 3-port valve and the NC type 3-port valve are constituted from the same parts. Therefore, there can be constituted a manifold in which the flowpassage can be easily changed from NC type to NO type and vice versa without increasing a dimension of the manifold and without changing the arranging direction of the pilot air control valve.

Further, since the distance from the manifold for all the solenoid valves is constant, even when the entire body is covered with a cover, a space can be used effectively without arising a dead space.

What is claimed is:

1. A manifold comprising a supply, an exhaust and an output port in which at least two on-off valves, different in at least one of number of output ports and output types, are mounted on a manifold base, wherein
said at least two on-off valves are mounted on said manifold base in the same direction;
said at least two on-off valves include a 3-port valve provided with a supply port, an exhaust port and an output port, and a 4-port valve provided with a supply port, an exhaust port and two output ports, the 4-port valve being a combined two of the 3-port valves and a single control device connected to both of the combined two 3-port valves for simultaneous operation thereof; and
a distance from said manifold base to an outside of said at least two on-off valves is constant.

2. The manifold according to claim 1, wherein each of said on-off valves is provided with a mounting portion protruding on both sides,
one of the both sides of said mounting portion is fitted in a recess formed in said manifold, and the other of the both sides of said mounting portion is secured to said manifold by a mounting fitting detachably mounted on a mounting bolt, and
a removing direction of said mounting bolt is substantially the same as a removing direction of said on-off valves.

3. The manifold according to claim 1, wherein said manifold has an extending portion on a mounting surface.

4. The manifold according to claim 1, wherein said output ports of said 3-port valve and said 4-port valve are linearly arranged.

5. The manifold according to claim 4, wherein said 3-port valve comprises a combination of a pilot air solenoid control valve for controlling pilot air, and one of a poppet valve and a spool valve driven by said pilot air,
said 4-port valve comprises a combination of two of said one of a poppet valve and a spool valve, and a single pilot air control solenoid valve.

6. The manifold according to claim 5, wherein said two of one of a poppet valve and a spool valve are arranged point-symmetrically.

7. The manifold according to claim 4, wherein said 3-port valve and said 4-port valve comprise a combination of a pilot air control valve for controlling pilot air, and one of a poppet valve and a spool valve driven by said pilot air, and
comprising a plate disposed between said pilot air control valve and said one of a poppet valve and a spool valve and formed with more than two flowpassages for pilot air.

8. The manifold according to claim 7, wherein said one of a poppet valve and a spool valve is arranged point-symmetrically.

9. The manifold according to claim 4, wherein said 3-port valve and said 4-port valve comprise a pilot type solenoid valve, and an electric wiring portion of said pilot type solenoid valve is linear.

10. The manifold according to claim 1, wherein said 3-port valve comprises a combination of a pilot air control solenoid valve for controlling pilot air, and one of a poppet valve and a spool valve driven by said pilot air, and
said 4-port valve comprises a combination of two of said one of poppet valves and spool valves, and single pilot air control solenoid valve.

11. The manifold according to claim 10, wherein said two poppet valves or spool valves are arranged point-symmetrically.

12. The manifold according to claim 1, wherein said 3-port valve and said 4-port valve comprise a combination of a pilot air control valve for controlling pilot air, and one of a poppet valve and a spool valve driven by said pilot air, and
comprising a plate disposed between said pilot air control valve and said one of a poppet valve and a spool valve and formed with more than two flowpassages for pilot air.

13. The manifold according to claim 12, wherein said one of a poppet valve and a spool valve is arranged point-symmetrically.

14. The manifold according to claim 1, wherein said 3-port valve and said 4-port valve comprises a pilot type solenoid valve, and an electric wiring portion of said pilot type solenoid valve is linear.

15. A manifold comprising a supply, an exhaust and an output port in which at least two on-off valves, different in at least one of number of output ports and output types, are mounted on a manifold base, wherein said at least two on-off valves are mounted on said manifold base in the same direction;

said on-off valves comprise a pilot type switching valve constituted by a combination of a pilot air control valve for controlling pilot air and one of a poppet valve and a spool valve driven by said pilot air, and include a normally open (NO) type 3-port valve in which normally a supply port is communicated with an output port, and a normally closed (NC) type 3-port valve in which normally an output port is communicated with an exhaust port;

said NO type 3-port valve and said NC type 3-port valve having identical constituent parts but differing by orientation of the constituent parts relative to the manifold base; and a distance from said manifold base to an outside of said at least two on-off valves is constant.

16. The manifold according to claim 15, wherein said on-off valve is provided with a mounting portion protruded on both sides, one of the both sides of said mounting portion is fitted in a recess formed in said manifold, and the other of the both sides of said mounting portion is secured to said manifold by a mounting fitting detachably mounted on a mounting bolt, and a removing direction of said mounting bolt a removing direction of said on-off valve are substantially the same.

17. The manifold according to claim 15, wherein said manifold has an extending portion on a mounting surface.

18. The manifold according to claim 15, wherein said one of a poppet valve and a spool valve is rotated by 180 degrees to thereby change a flowpassage between NO type and NC type.

19. The manifold according to claim 18, wherein supply and exhaust ports formed in connecting surfaces of said 3-port valve and said manifold base are arranged point-symmetrically about the output port.

20. The manifold according to claim 18, comprising a plate disposed between said pilot air control valve and said one of a poppet valve and a spool valve and formed with more than two flowpassages for pilot air.

21. The manifold according to claim 15, wherein supply and exhaust ports formed in connecting surfaces of said 3-port valve and said manifold base are arranged point-symmetrically about the output port.

* * * * *

UNITED STATES PATENT AND TRADEMARK OFFICE
CERTIFICATE OF CORRECTION

PATENT NO. : 5,915,409
DATED : June 29, 1999
INVENTOR(S) : KANEKO ET AL.

It is certified that error appears in the above-indentified patent and that said Letters Patent is hereby corrected as shown below:

Claim 16, col. 20, line 7, after "bolt", insert --and--.

Signed and Sealed this

Ninth Day of November, 1999

Attest:

Attesting Officer

Q. TODD DICKINSON

Acting Commissioner of Patents and Trademarks